(12) United States Patent
Higashi

(10) Patent No.: US 11,654,827 B2
(45) Date of Patent: May 23, 2023

(54) DRIVING SOUND GENERATION DEVICE AND DRIVING SOUND GENERATION METHOD

(71) Applicant: PANASONIC INTELLECTUAL PROPERTY MANAGEMENT CO., LTD., Osaka (JP)

(72) Inventor: Kiyohisa Higashi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/700,868

(22) Filed: Mar. 22, 2022

(65) Prior Publication Data
US 2022/0305989 A1  Sep. 29, 2022

(30) Foreign Application Priority Data
Mar. 29, 2021  (JP) ............... JP2021-055504

(51) Int. Cl.
*B60Q 9/00* (2006.01)
*G10K 11/175* (2006.01)
*G10K 15/02* (2006.01)
*G10K 15/04* (2006.01)
*G10K 11/178* (2006.01)

(52) U.S. Cl.
CPC ............ *B60Q 9/00* (2013.01); *G10K 11/175* (2013.01); *G10K 15/02* (2013.01); *G10K 15/04* (2013.01); *G10K 11/17883* (2018.01)

(58) Field of Classification Search
CPC .......... B60Q 9/00; G10K 15/02; G10K 15/04; G10K 11/175; G10K 11/1752; G10K 11/1754; G10K 11/17883; G10K 2210/128

USPC .......................................................... 381/86
See application file for complete search history.

(56) References Cited

U.S. PATENT DOCUMENTS

2013/0163777 A1* 6/2013 Tashiro .................... H04K 3/41
                                                              381/73.1
2015/0356965 A1* 12/2015 Tani ...................... G10K 11/175
                                                              381/71.4
(Continued)

FOREIGN PATENT DOCUMENTS

JP        2006-171657 A       6/2006
JP          5659989 B2        1/2015

*Primary Examiner* — Vivian C Chin
*Assistant Examiner* — Douglas J Suthers
(74) *Attorney, Agent, or Firm* — Greenblum & Bernstein, P.L.C.

(57) ABSTRACT

A driving sound generation device includes: an acquirer that acquires vehicle information; a storage that stores a plurality of sound source data including driving sound source data and masker sound source data for generating a masker sound; a first adjuster that performs a first adjustment of the plurality of sound source data in accordance with the vehicle information; a second adjuster that performs a second adjustment of at least one of the plurality of sound source data after the first adjustment when the determiner determines that a change amount is smaller than or equal to a predetermined change amount; and a synthesizer that mixes the plurality of sound source data after the second adjustment to generate a driving sound to be output into a cabin of the vehicle; and an outputter that outputs, to the cabin of the vehicle, the driving sound generated.

4 Claims, 14 Drawing Sheets

(56) References Cited

U.S. PATENT DOCUMENTS

2018/0166061 A1* 6/2018 Kotegawa .......... G10K 11/1752
2020/0184946 A1* 6/2020 Jung ...................... B60C 5/008

* cited by examiner

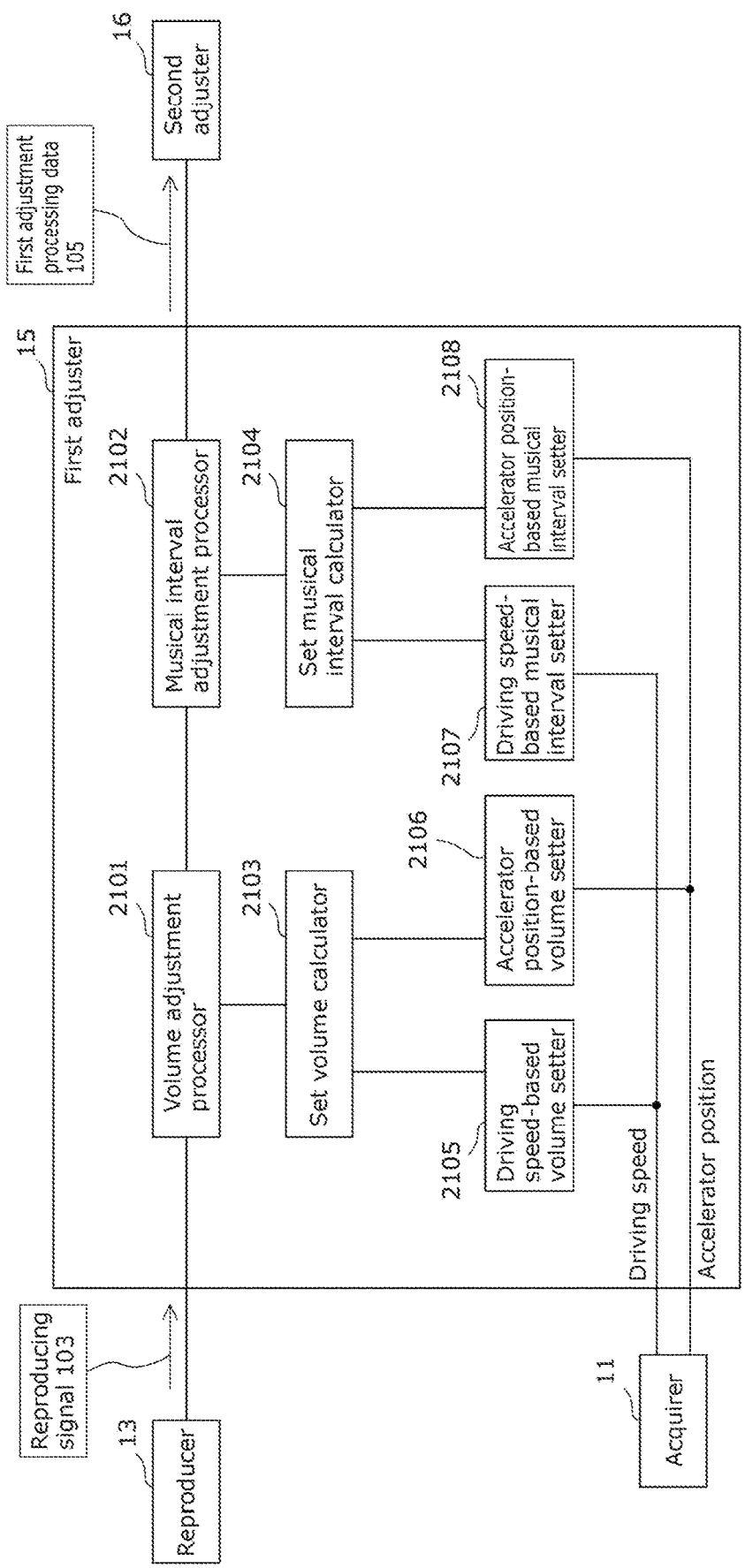

DRIVING SOUND GENERATION DEVICE AND DRIVING SOUND GENERATION METHOD

CROSS REFERENCE TO RELATED APPLICATION

The present application is based on and claims priority of Japanese Patent Application No. 2021-055504 filed on Mar. 29, 2021.

FIELD

The present disclosure relates to a driving sound generation device that generates pseudo driving sounds in a vehicle cabin.

BACKGROUND

Patent Literature (PTL) 1 discloses the technique of generating a pseudo driving sound and outputting the generated driving sound to a vehicle cabin. PTL 1 discloses reducing the volume of the pseudo driving sound when the duration of a steady driving condition is a predetermined time or more to reduce the annoyance or fatigue of an occupant caused by outputting substantially the same pseudo driving sound.

CITATION LIST

Patent Literature

PTL 1: Japanese Unexamined Patent Application Publication No. 2006-171657

SUMMARY

However, the technology according to PTL 1 can be improved upon.

The present disclosure provides a driving sound generation device and a driving sound generation method which are capable of improving upon the above related art.

A driving sound generation device according to an aspect of the present disclosure includes: an acquirer that acquires vehicle information on drive of a vehicle; a storage that stores a plurality of sound source data including masker sound source data for generating a masker sound for masking a noise in the vehicle; a first adjuster that performs a first adjustment of the plurality of sound source data in accordance with the vehicle information; a determiner that determines whether a change amount of the vehicle information is smaller than or equal to a predetermined change amount; a second adjuster that performs a second adjustment of at least one of the plurality of sound source data after the first adjustment other than the masker sound source data after the first adjustment, when the determiner determines that the change amount is smaller than or equal to the predetermined change amount; a synthesizer that mixes the plurality of sound source data after the second adjustment and the masker sound according to the masker sound source data after the first adjustment to generate a pseudo driving sound to be output into a cabin of the vehicle; and an outputter that outputs, to the cabin of the vehicle, the pseudo driving sound generated.

A driving sound generation method according to an aspect of the present disclosure includes: acquiring vehicle information on drive of a vehicle; performing a first adjustment of a plurality of sound source data stored in a storage in accordance with the vehicle information and including masker sound source data for generating a masker sound for masking a noise in the vehicle; determining whether a change amount of the vehicle information is smaller than or equal to a predetermined change amount; performing a second adjustment of at least one of the plurality of sound source data after the first adjustment other than the masker sound source data after the first adjustment, when the change amount is determined to be smaller than or equal to the predetermined change amount in the determining; mixing the plurality of sound source data after the second adjustment and the masker sound according to the masker sound source data after the first adjustment to generate a pseudo driving sound to be output into a cabin of the vehicle; and outputting, to the cabin of the vehicle, the pseudo driving sound generated.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 6 is a diagram of the first adjuster according to the embodiment.

Figure 1:
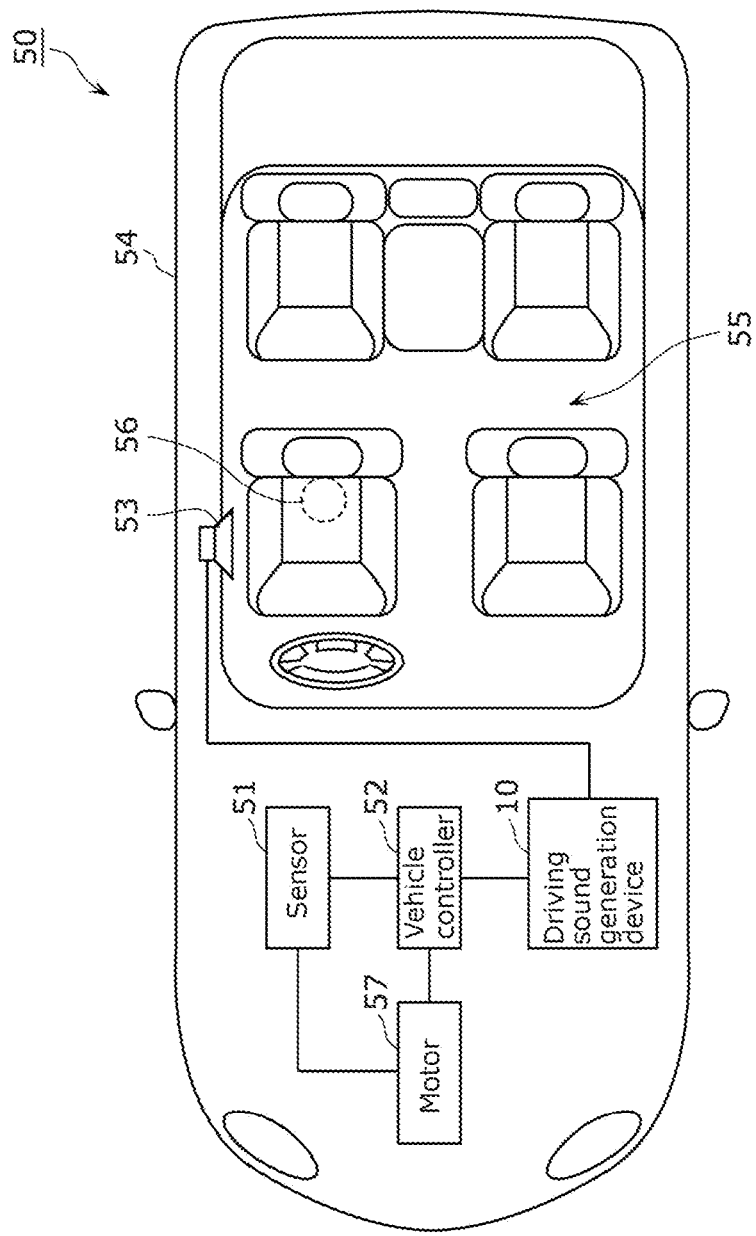
FIG. 1 is a schematic view of a vehicle including a driving sound generation device according to an embodiment.

DESCRIPTION OF EMBODIMENT (Underlying Knowledge Forming Basis of Present Disclosure)

In a known technique like PTL 1, a pseudo driving sound is output to the cabin of a vehicle without engine and thus causing fewer driving noise while driving. In this technique, the volume or musical interval (pitch) of sound source data is adjusted in accordance with vehicle information such as a vehicle speed or an accelerator position. The sound after such adjustment is output as a pseudo driving sound to the vehicle cabin to allow an occupant to recognize the driving condition of the vehicle using the pseudo driving sound. That is, the occupant has driving feeling by hearing the pseudo driving sound.

On the other hand, after the duration of a same driving condition like steady driving, the tone or volume of a pseudo driving sound are substantially stable during the same period, which may make the occupant feel annoyed or tired.

The technique according to PTL 1 turns down the volume of a pseudo driving sound after the duration of a same driving condition to reduce the annoyance or fatigue of an occupant.

It is however for an occupant to recognize the driving condition of the vehicle using a pseudo driving sound at a lower volume. That is, the technique of PTL 1 has difficulty in reducing annoyance caused by the pseudo driving sound after the duration of a single driving condition, while causing the occupant to recognize the driving condition of the vehicle using the pseudo driving sound.

It is known that a noise with a volume or musical interval changing in accordance with a change in the vehicle information occurs in a vehicle and makes an occupant feel uncomfortable. In order to reduce the discomfort of such the noise, there is a known technique of generating a masker sound in accordance with the volume and musical interval of a noise and outputting the masker sound to the vehicle cabin to mask the noise.

For example, an example of this noise is an electromagnetic noise of a motor of a vehicle, such as an electric vehicle (EV) or a hybrid vehicle (HV), equipping the motor as a power source for driving. At least one of the musical interval or volume of the electromagnetic noise of the motor changes in accordance with a numerical value acquired by multiplying the motor speed indicated by the vehicle information by a real number. This numerical value changes at least one of the musical interval or volume of a masker sound source. A masker sound is subjected to signal processing so as to be capable of masking at a predetermined position in a vehicle, and output to mask a target noise.

After the duration of a single driving condition as in steady driving, a substantially constant masker sound may be generated and make an occupant of the vehicle feel annoyed or tired.

However, with a decrease in the volume of the masker sound to reduce the annoyance, the volume of the masker sound becomes lower than the volume of the noise. The noise is then heard by the occupant and becomes more uncomfortable.

The present disclosure provides the following driving sound generation device, for example. The device allows an occupant to recognize the driving condition of a vehicle using a pseudo driving sound, reduces the discomfort caused by stable characteristics of the pseudo driving sound with steady driving, and reduces the discomfort of a noise in the vehicle cabin.

In order to achieve the objective, a driving sound generation device according to an aspect of the present disclosure includes: an acquirer that acquires vehicle information on drive of a vehicle; a storage that stores a plurality of sound source data including masker sound source data for generating a masker sound for masking a noise in the vehicle; a first adjuster that performs a first adjustment of the plurality of sound source data in accordance with the vehicle information; a determiner that determines whether a change amount of the vehicle information is smaller than or equal to a predetermined change amount; a second adjuster that performs a second adjustment of at least one of the plurality of sound source data after the first adjustment other than the masker sound source data after the first adjustment, when the determiner determines that the change amount is smaller than or equal to the predetermined change amount; a synthesizer that mixes the plurality of sound source data after the second adjustment and the masker sound according to the masker sound source data after the first adjustment to generate a pseudo driving sound to be output into a cabin of the vehicle; and an outputter that outputs, to the cabin of the vehicle, the pseudo driving sound generated.

Assume that the change amount of the vehicle information is smaller than or equal to the predetermined change amount. In this case, the pseudo driving sound is changed by adjusting at least one of the plurality of sound source data after the first adjustment generated as the driving sound.

In addition, the discomfort of the noise generated in the vehicle cabin decreases because the masker sound is not adjusted by the second adjustment. Accordingly, the configuration described above allows the driver to recognize the driving condition of the vehicle using the pseudo driving sound, and effectively reduces the driver's discomfort of the pseudo driving sound annoying the driver. In addition, the driver feels less uncomfortable even at the occurrence of a noise in the vehicle cabin.

The second adjuster may not perform the second adjustment of the masker sound source data after the first adjustment.

The plurality of sound source data may further include driving sound source data for generating the pseudo driving sound of the vehicle. The first adjuster may perform the first adjustment of the driving sound source data. The second adjuster may perform the second adjustment of the driving sound source data after the first adjustment.

A driving sound generation method according to an aspect of the present disclosure includes: acquiring vehicle information on drive of a vehicle; performing a first adjustment of a plurality of sound source data stored in a storage in accordance with the vehicle information and including masker sound source data for generating a masker sound for masking a noise in the vehicle; determining whether a change amount of the vehicle information is smaller than or equal to a predetermined change amount; performing a second adjustment of at least one of the plurality of sound source data after the first adjustment other than the masker sound source data after the first adjustment, when the change amount is determined to be smaller than or equal to the predetermined change amount in the determining; mixing the plurality of sound source data after the second adjustment and the masker sound according to the masker sound source data after the first adjustment to generate a pseudo driving sound to be output into a cabin of the vehicle; and outputting, to the cabin of the vehicle, the pseudo driving sound generated.

Assume that the change amount of the vehicle information is smaller than or equal to the predetermined change amount. In this case, the pseudo driving sound is changed by adjusting at least one of the plurality of sound source data after the first adjustment generated as the driving sound. In addition, the discomfort of the noise generated in the vehicle cabin decreases because the masker sound is not adjusted by the second adjustment. Accordingly, the method allows the driver to recognize the driving condition of the vehicle using the pseudo driving sound, and effectively reduces the driver's discomfort of the pseudo driving sound. In addition, the driver feels less uncomfortable even at the occurrence of a noise in the vehicle cabin.

In order to achieve the objective, a driving sound generation device according to another aspect of the present disclosure includes: an acquirer that acquires vehicle information on drive of a vehicle; a storage that stores a plurality of sound source data; a first adjuster that performs a first adjustment of the plurality of sound source data in accordance with the vehicle information; a determiner that determines whether a change amount of the vehicle information is smaller than or equal to a predetermined change amount; a second adjuster that performs a second adjustment of at least one of the plurality of sound source data after the first adjustment, when the determiner determines that the change amount is smaller than or equal to the predetermined change amount; a synthesizer that mixes the plurality of sound source data after the second adjustment to generate a driving sound to be output into a cabin of the vehicle; and an outputter that outputs, to the cabin of the vehicle, the driving sound generated.

This configuration adjusts the sound source data in accordance with a change in the vehicle information, and outputs, to the vehicle cabin, the adjusted sound source data as a pseudo driving sound for causing the occupant to recognize the driving condition. At this time, if the change amount of the vehicle information is smaller than or equal to the predetermined change amount, the configuration adjusts at least one of the plurality of sound source data generated as the driving sound to change the pseudo driving sound. Accordingly, this configuration allows the occupant to recognize the driving condition of the vehicle using the pseudo driving sound, and effectively reduces the annoyance of the pseudo driving sound with substantially the same tone or volume due to a small change amount of the vehicle information.

In the first adjustment, the first adjuster may adjust the volumes and/or musical intervals of the plurality of sound source data.

This configuration adjusts the volume and/or musical interval of at least one of the plurality of sound source data in the first adjustment. Accordingly, this configuration effectively reduces the annoyance of the pseudo driving sound with substantially the same tone and volume due to a small change amount of the vehicle information.

The second adjuster may adjust the volume and/or musical interval of at least one of the plurality of sound source data after the first adjustment of the second adjustment.

This configuration adjusts the volume and/or musical interval of at least one of the plurality of sound source data in the second adjustment. Accordingly, this configuration effectively reduces the annoyance of the pseudo driving sound with substantially the same tone or volume due to a small change amount of the vehicle information.

Assume that the determiner determines that the change amount of the vehicle information is larger than the predetermined change amount. In this case, the second adjuster may output the sound source data after the first adjustment to the synthesizer without adjusting the sound source data.

This configuration outputs the sound source data adjusted by the first adjuster without being changed, if the change amount of the vehicle information is larger than the predetermined change amount. Accordingly, the occupant feels driving from the pseudo driving sound because the adjustment of the vehicle information can be reflected on the sound source data.

The plurality of sound source data have sound pressure energies or peak sound pressure levels of the frequency characteristics different from each other. In the second adjustment, the second adjuster may not adjust the one of the plurality of sound source data after the first adjustment with the largest sound pressure energy or the highest peak of the sound pressure level of the frequency characteristics.

This configuration does not adjust the characteristics of the sound source data with the maximum volume out of the generated pseudo driving sound, if the change amount of the vehicle information is smaller than or equal to the predetermined change amount. While keeping the driving condition information reflected on the sound source data, this device also reduces the annoyance in steady driving by adjusting the other sound source data.

The plurality of sound source data have sound pressure energies or peak sound pressure levels of the frequency characteristics different from each other. In the second adjustment, the second adjuster may adjust the one of the plurality of sound source data after the first adjustment with the second largest sound pressure energy or the second highest peak of the sound pressure level of the frequency characteristics.

Assume that the change amount of the vehicle information is smaller than or equal to the predetermined change amount. In this case, this configuration allows the occupant to effectively perceive the change in the sound by the second adjustment and effectively reduces the annoyance of the pseudo driving sound in steady driving.

The plurality of sound source data have sound pressure energies or peak sound pressure levels of the frequency characteristics different from each other. In the second adjustment, the second adjuster may identify sound source data most easily perceived by human out of the plurality of sound source data after the first adjustment by hearing characteristics of human and may not adjust that sound source data.

This configuration does not adjust the characteristics of the sound source data most easily perceived by human and thus allows the occupant to effectively perceive the driving conditions reflected on the sound source data.

The plurality of sound source data have sound pressure energies or peak sound pressure levels of the frequency characteristics different from each other. In the second adjustment, the second adjuster may identify sound source data second most easily perceived by human, out of the plurality of sound source data after the first adjustment, by hearing characteristics of human and may not adjust that sound source data.

This configuration adjusts the sound source data second most easily perceived by human. Assume that the change amount of the vehicle information is smaller than or equal to the predetermined change amount. In this case, this configuration allows the occupant to effectively perceive the change in the sound in the second adjustment and effectively reduces the annoyance of the pseudo driving sound.

In the second adjustment, the second adjuster may adjust the sound pressure level of at least one of the sound source data after the first adjustment by a predetermined level difference.

The sound pressure level of the sound source data after the first adjustment is changed. If the change amount of the vehicle information is smaller than or equal to the predetermined change amount, the occupant perceives the change in the pseudo driving sound and is less annoyed in steady driving.

In the second adjustment, the second adjuster may adjust the sound pressure level of at least one of the sound source data after the first adjustment by a predetermined level difference in a predetermined period.

If the change amount of the vehicle information is smaller than or equal to the predetermined change amount, the occupant perceives the change in the pseudo driving sound and is less annoyed in steady driving.

In the second adjustment, in accordance with the vehicle information, the second adjuster may adjust the level difference or period used to adjust sound pressure level.

If the change amount of the vehicle information is smaller than or equal to the predetermined change amount, the occupant recognizes the vehicle speed in the period for adjusting the sound pressure level of the sound source data. The occupant is also less annoyed in steady driving and effectively perceives the driving conditions.

In the second adjustment, the second adjuster may adjust the period and/or the difference for raising or lowering the sound pressure level by the predetermined level difference in accordance with the duration in which the change amount of the vehicle information is smaller than or equal to the predetermined change amount.

If the change amount of the vehicle information is smaller than or equal to the predetermined change amount, the occupant recognizes the vehicle speed in the period for adjusting the sound pressure level of the sound source data. The occupant is also less annoyed in steady driving and effectively perceives the driving conditions.

In the second adjustment, the second adjuster may periodically adjust the period of raising or lowering the sound pressure level by the predetermined level difference.

This configuration periodically adjusts the periodical change in the sound pressure level to further reduce the stability of the pseudo driving sound in steady driving. This effectively reduces the annoyance in the steady driving.

In the second adjustment, the second adjuster may adjust at least one of the minimum or maximum frequency of at least one of the sound source data after the first adjustment within the predetermined frequency range by a predetermined frequency difference.

The frequency range of the sound source data after the first adjustment is changed. If the change amount of the vehicle information is smaller than or equal to the predetermined change amount, the occupant perceives the change in the pseudo driving sound and is less annoyed in steady driving.

In the second adjustment, the second adjuster may adjust the frequency by the predetermined frequency difference in a predetermined period.

Accordingly, the occupant perceives the change in the pseudo driving sound and is less annoyed in steady driving.

In the second adjustment, the second adjuster may adjust the period and/or frequency difference for varying the frequency in accordance with the vehicle information.

The frequency range of the sound source data after the first adjustment periodically varies in accordance with the vehicle speed. This allows various changes in the pseudo driving sound and effectively reduces the annoyance in the steady driving.

In the second adjustment, the second adjuster may adjust the period and/or the frequency difference for varying the frequency in accordance with the duration in which the change amount of the vehicle information is smaller than or equal to the predetermined change amount.

Assume that the change amount of the vehicle information has been smaller than or equal to the predetermined change amount for a long time. In this case, the sound source data after the first adjustment is changed in accordance with the duration. This configuration allows the occupant to recognize the change in the pseudo driving sound even in the steady driving for the long time and reduces the annoyance.

In the second adjustment, the second adjuster may periodically adjust the period for varying the frequency.

This configuration periodically adjusts the sound source data after the first adjustment to further reduce the stability of the pseudo driving sound in steady driving, and effectively reduces the annoyance.

Assume that the value indicated by the vehicle information is smaller than or equal to the predetermined value but the determiner determines that the change amount is smaller than or equal to the predetermined change amount. In this case, the second adjuster may not perform the second adjustment of the plurality of sound source data.

This configuration reduces a change in the pseudo driving sound caused by performing or not performing the second adjustment frequently where the vehicle conditions are less likely to be stable, and reduces the processing load of the second adjustment processing.

The vehicle information may be one or all of the vehicle speed, the accelerator position, the torque, and the acceleration alone or in combination.

In order to achieve the objective, a driving sound generation method according to an aspect of the present disclosure includes: acquiring vehicle information on drive of a vehicle; performing a first adjustment of a plurality of sound source data stored in a storage in accordance with the vehicle information; determining whether a change amount of the vehicle information is smaller than or equal to a predetermined change amount; performing a second adjustment of at least one of the plurality of sound source data after the first adjustment, when the change amount is determined to be smaller than or equal to the predetermined change amount in the determining; mixing the plurality of sound source data after the second adjustment to generate a driving sound to be output into a cabin of the vehicle; and outputting, to the cabin of the vehicle, the driving sound generated.

This method adjusts the sound source data in accordance with a change in the vehicle information, and outputs, into the vehicle cabin, the changed sound source data as a pseudo driving sound for causing the occupant to recognize the driving condition. At this time, if the change amount of the vehicle information is smaller than or equal to the predetermined change amount, at least one of the plurality of sound source data generated as the driving sound is adjusted to change the pseudo driving sound. Accordingly, this method allows the occupant to recognize the driving condition of the vehicle using the pseudo driving sound, and effectively reduces the annoyance of the pseudo driving sound with substantially the same tone or volume due to a small change amount of the vehicle information.

Now, an embodiment will be described in detail with reference to the drawings. Note that the embodiment described below is a mere comprehensive or specific example of the present disclosure. The numerical values, shapes, materials, constituent elements, the arrangement and connection of the constituent elements, steps, step orders etc. shown in the following embodiment are thus mere examples, and are not intended to limit the scope of the present disclosure. Among the constituent elements in the following embodiment, those not recited in any of the independent claims defining the broadest concept of the present disclosure are described as optional constituent elements.

The figures are schematic representations and not necessarily drawn strictly to scale. In the figures, substantially the same constituent elements are assigned with the same reference marks, and redundant descriptions will be omitted or simplified.

Embodiment

[Overall Configuration of Vehicle Including Driving Sound Generation Device]

In an embodiment, a driving sound generation device mounted on a vehicle will be described. FIG. 1 is a schematic view of the vehicle including the driving sound generation device according to the embodiment.

Vehicle 50 includes driving sound generation device 10, sensors 51, vehicle controller 52, speaker 53, and vehicle body 54. Vehicle 50 is specifically an automobile but is not limited thereto.

Each sensor 51 detects the conditions of each part equipped by vehicle 50 and outputs the magnitudes as signals. Each sensor 51 attached to an accelerator detects and outputs the signals as accelerator position information. In this embodiment, each sensor 51 detects not only the conditions of a part of interest but also the conditions of related parts. With respect to the driving speed, if vehicle 50 is an electric vehicle, sensors 51 are placed in motor 57 of vehicle 50 to detect and output values such as a motor speed, a current value, and a torque. If vehicle 50 is an engine vehicle, sensors 51 output an engine speed and an engine torque, for example.

Motor 57 generates power for accelerating vehicle 50 in the drive of vehicle 50. Motor 57 may acquire regenerative energy caused at the time of decelerating vehicle 50. Vehicle 50 is, for example, an electric vehicle (EV) including motor 57.

Vehicle controller 52 controls the driving of vehicle 50 in accordance with an operation of vehicle 50 by a driver, and acquires signal 501 from sensor 51. Vehicle controller 52 is, for example, an electronic control unit (ECU) which specifically is a processor, a microcomputer, or a dedicated circuit. Vehicle controller 52 may be a combination of two or more of a processor, a microcomputer, and a dedicated circuit.

Speaker 53 outputs a pseudo driving sound output from driving sound generation device 10. Speaker 53 is placed, for example, on a wall (or a door) near the driver's seat inside vehicle 50 to output a pseudo driving sound adjusted to be properly heard by an occupant in predetermined position 56 near the driver's seat. Predetermined position 56 is, for example, the position at which the occupant is seated in vehicle 50.

In the example of FIG. 1, speaker 53 is located on the wall near the driver's seat. The location is however not limited thereto. Speaker 53 may be located in another position. The pseudo driving sound is not necessarily output from single speaker 53 but from a plurality of speakers. These speakers may be located at any positions of vehicle body 54.

Vehicle body 54 is a structure including a chassis and a body of vehicle 50, for example. Vehicle body 54 defines space 55 in vehicle 50 (i.e., a space in the vehicle cabin) in which speaker 53 is placed.

[Configuration of Driving Sound Generation Device]

Figure 2:
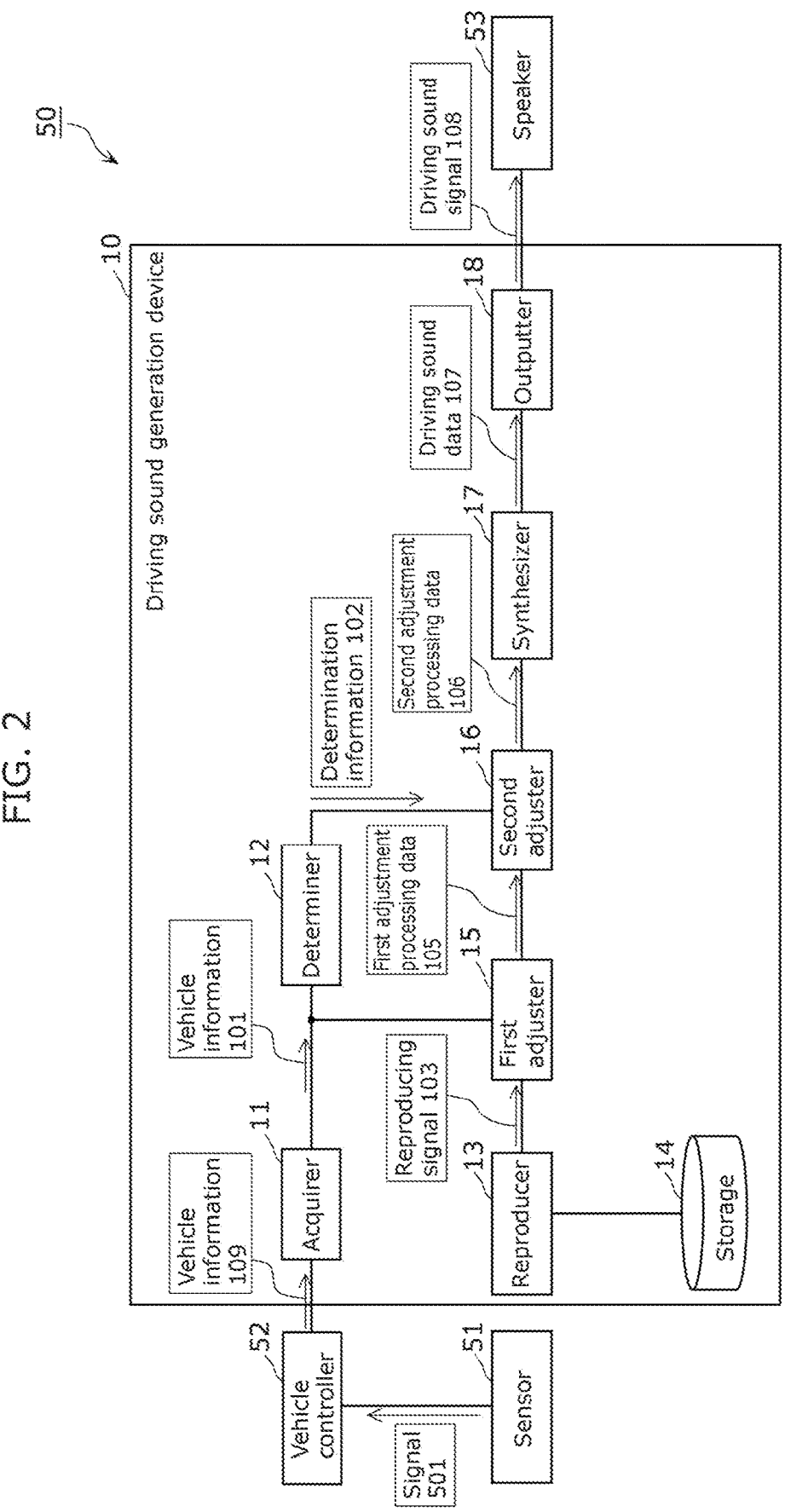
FIG. 2 is a functional block diagram of the driving sound generation device according to the embodiment.

Now, a configuration and a basic operation of driving sound generation device 10 will be described with reference to FIG. 2 in addition to FIG. 1. FIG. 2 is a functional block diagram of driving sound generation device 10.

Driving sound generation device 10 generates a pseudo driving sound for making the driver feel driving. The pseudo driving sound has characteristics, such as a volume, a musical interval, or sound effects, changing in accordance with the value as the vehicle information changed in accordance with the driving condition of vehicle 50. The occupant recognizes the driving condition of vehicle 50 based on these characteristics of the pseudo driving sound. Driving sound generation device 10 generates the pseudo driving sound based on the vehicle information on the drive of the vehicle output from vehicle controller 52. Driving sound generation device 10 then outputs the generated pseudo driving sound through speaker 53 to allow the driver to recognize the driving condition of the vehicle. For example, when a driver accelerates an engine vehicle while driving, the musical interval of the engine sound rises. When the driver depresses the accelerator, the volume of the engine sound rises. A change in the driving sound in accordance with the change in the driving condition is reflected on the characteristics of the sound source data at the time of generating the pseudo driving sound. Accordingly, the occupant recognizes the driving condition of the vehicle from the pseudo driving sound.

The pseudo driving sound imitates an engine sound in actual driving, for example. As the sound source, data acquired by recording the engine sound of an engine vehicle is used. While the sound source is repeatedly reproduced by a reproduction device, the characteristics of the reproduced sound are changed in accordance with the driving condition. A pseudo driving sound according to an engine sound applied to an electric vehicle makes the driver feel as if he/she were driving an engine vehicle.

The pseudo driving sound may employ sound source data that is actually completely irrelative to a driving sound of a vehicle such as an automobile. For example, the pseudo driving sound may be a sound of an instrument being played or a sound generated by synthesis by a synthesizer. The plurality of sound source data are mixed and reproduced to change the characteristics of the reproduced sound in accordance with the driving conditions. As a result, a pseudo driving sound according to an impression or concept of an automobile different from a usual driving sound of the vehicle.

As shown in FIG. 2, driving sound generation device 10 includes acquirer 11, determiner 12, reproducer 13, storage 14, first adjuster 15, second adjuster 16, synthesizer 17, and outputter 18.

[Acquirer 11]

Acquirer 11 acquires vehicle information 109 on the drive inside vehicle 50 from vehicle controller 52. Acquirer 11 sequentially acquires vehicle information 109 from vehicle controller 52. Acquirer selects or calculates necessary information from vehicle information 109 and outputs vehicle information 101 necessary for outputting a pseudo driving sound. In this embodiment, vehicle information 101 specifically indicates the driving speed of vehicle 50 or the amount of depression of the accelerator (i.e., the accelerator position) of vehicle 50. Vehicle information 109 acquired from vehicle controller 52 may not be the driving speed or the accelerator position itself but may be other information indicating the driving condition from which the driving speed or the accelerator position can be calculated. In such a case, acquirer 11 reads related vehicle information 109 and performs a predetermined calculation to acquire necessary driving speed information or accelerator position information.

In the case of an engine vehicle, the information indicating the engine speed, the engine torque, or the acceleration may be the driving speed of vehicle 50 detected by the vehicle speed sensor, or may be calculated from at least one of the brake oil pressure, the drive shaft speed, or the torque of vehicle 50. The vehicle information may be, for example, an index indicated by consecutive numerical values or a waveform formed with another index having a correlation. Acquirer 11 is, for example, a communication module (or a communication circuit) that acquires a pulse signal from vehicle controller 52 via a communication under the protocols of vehicle controller 52 and a CAN). Acquirer 11 may be a communication module under the other communication protocol and is not particularly limited.

[Determiner 12]

Determiner 12 determines whether the change amount of the vehicle information is smaller than or equal to a predetermined change amount. Determiner 12 makes a determination for each of the plurality of vehicle information 101 output from acquirer 11. A result of determination is output as determination information 102.

Figure 3:
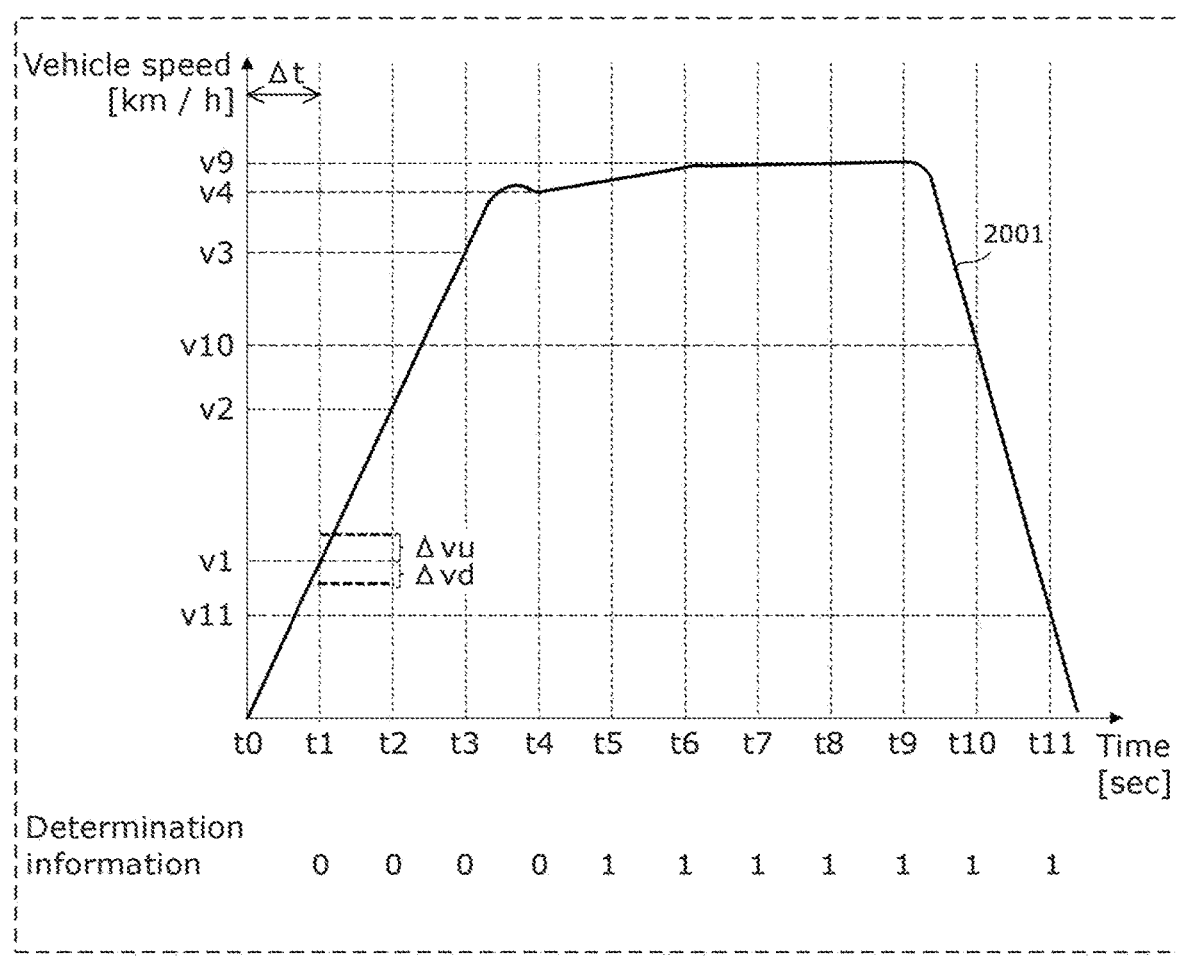
FIG. 3 illustrates an operation of a determiner, when vehicle information according to the embodiment indicates a driving speed.

FIG. 3 illustrates an operation of determiner 12, if the vehicle information according to this embodiment indicates driving speed. In FIG. 3, solid line 2001 represents the driving speed of the vehicle output from acquirer 11. Determiner 12 checks the driving speed at time interval $\Delta t$. For example, determiner 12 acquires driving speed v1 at time t1, and compares driving speed v1 with driving speed v0 at time t0 which is earlier than time t1 by time $\Delta t$. Change amounts $\Delta vu$ and $\Delta vd$ of predetermined driving speeds are used. Assume that driving speed v1 is lower than or equal to driving speed v0+$\Delta vu$, and higher than or equal to driving speed v0−$\Delta vd$. In this case, determiner 12 determines that the change amount of driving speed v1 is small, and outputs zero as a numerical value indicating determination information 102. On the other hand, assume that driving speed v1 is higher than driving speed v0+$\Delta vu$, or smaller than driving speed v0−$\Delta vd$. In this case, determiner 12 determines that there is a large amount of change, and outputs one as determination information 102.

Determiner 12 may make the determination described above using the moving average of the driving speed calculated based on the plurality of driving speeds in the recent past, for example.

Determiner 12 also checks a value indicated by the vehicle information. Assume that the value is greater than or equal to a predetermined value. Even if the change amount of the vehicle information is smaller than a predetermined change amount, determiner 12 outputs zero as determination information 102.

For example, in the case of an automobile driving on a city road, vehicle 50 frequently repeats acceleration and deceleration depending on traffic conditions such as traffic lights. The steady driving condition for a long period is unlikely to occur which may cause an annoying pseudo driving sound. For this reason, 40 km/h, which is the speed limit in a city, is set as a threshold. If the driving speed is lower than the threshold, zero is output as determination information 102.

[Storage 14]

Figure 4:
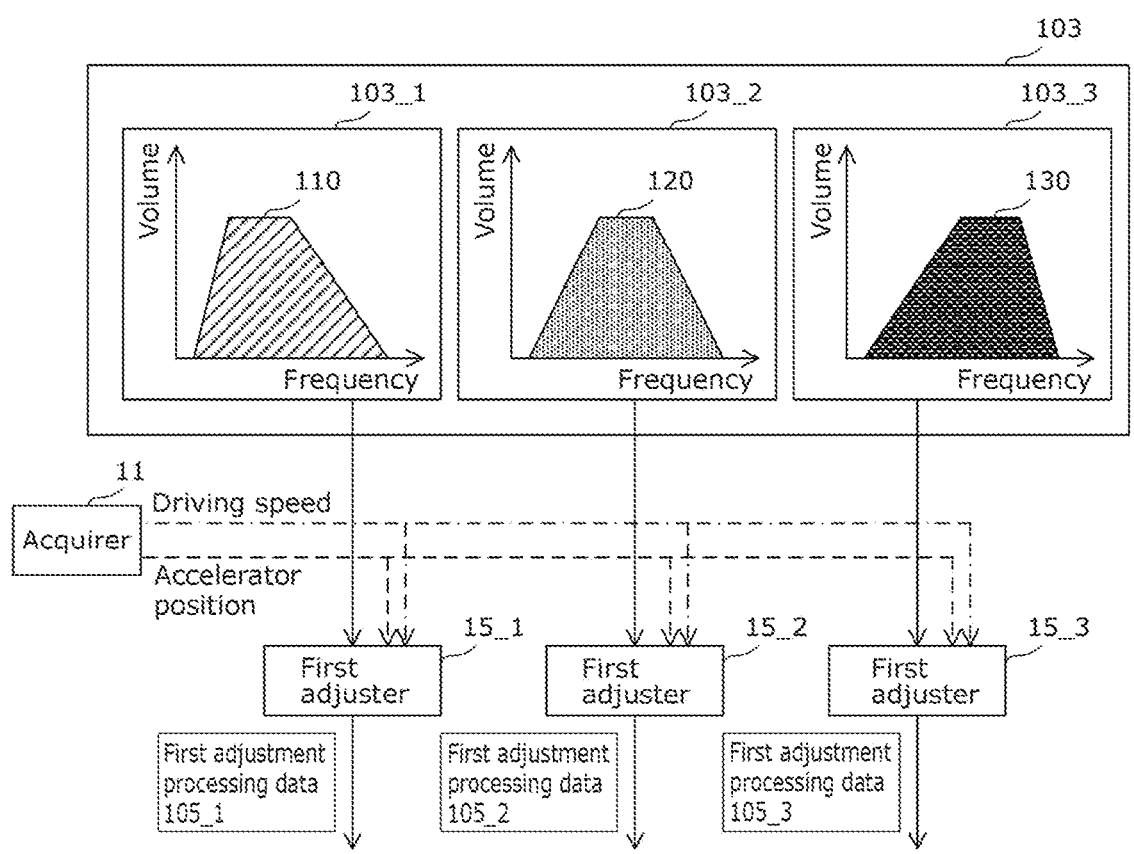
FIG. 4 illustrates a first adjustment by a first adjuster according to the embodiment.

Storage 14 stores sound source data. Specifically, storage 14 stores a plurality of sound source data. The plurality of sound source data have frequency ranges different from each other. In this embodiment, the plurality of sound source data include, for example, three sound source data as will be described later with reference to FIG. 4.

The sound source data may be general music, audio data, signals indicating sine waves and square waves of a specific frequency, and a random noise such as a white noise or a pink noise. In addition, a noise, an engine sound, an exhaust sound, or other sounds in the vehicle cabin may be recorded and converted into data. The sound source data may be a combination thereof. These may be limited in accordance with a bandwidth by a low-pass filter, a high-pass filter, or a band-pass filter, for example.

[Reproducer 13]

Reproducer 13 reads the plurality of sound source data stored in storage 14 at the same time to output reproducing signal 103. Reproducer 13 reads sound source data with a limited data length from the top to the end, and then returns to the top to repeatedly read and reproduce the data. Accordingly, reproducer 13 generates reproducing signal 103 for a longer period than the time for the sound source data.

[First Adjuster 15]

First adjuster 15 performs a first adjustment of at least one of the volume or musical interval of reproducing signal 103 generated by reproducer 13 in accordance with the vehicle information. Specific processing of the first adjustment will be described with reference to FIGS. 4, 5A to 5C, and 6.

First adjuster 15 adjusts the characteristics (the volume or the musical interval in this embodiment) of the plurality of reproducing signal 103 output from reproducer 13 in accordance with the driving speed information or the accelerator position information output from acquirer 11.

FIG. 6 is a diagram of the first adjuster.

Driving speed-based volume setter 2105 holds a predetermined adjusted volume value of the sound source data at a driving speed. Upon receipt of the driving speed information output from acquirer 11, driving speed-based volume setter 2105 outputs the adjusted volume value corresponding to the driving speed.

Accelerator position-based volume setter 2106 holds a predetermined adjusted volume value of sound source data at an accelerator position. Upon receipt of the accelerator position information output from acquirer 11, accelerator position-based volume setter 2106 outputs the adjusted volume value corresponding to the accelerator position.

For example, in this embodiment, driving speed-based volume setter 2105 is a table in which the horizontal axis represents the driving speed and the vertical axis represents the adjusted volume value. On the other hand, accelerator position-based volume setter 2106 is a table in which the horizontal axis represents the accelerator position and the vertical axis represents the adjusted volume value. In accordance with the values indicated by the information, the adjusted volume values acquired from the tables are output. This embodiment is however not limited thereto.

Set volume calculator 2103 calculates a volume gain value for adjusting the volume of the sound source data and outputs the calculated volume gain value. Used for the calculation are: the adjusted volume value at a driving speed output from driving speed-based volume setter 2105; and the adjusted volume value at an accelerator position output from accelerator position-based volume setter 2106.

Driving speed-based musical interval setter 2107 holds a predetermined adjusted musical interval value of the sound source data at each driving speed. Upon receipt of the driving speed information output from acquirer 11, driving speed-based musical interval setter 2107 outputs the adjusted musical interval value corresponding to the driving speed.

Accelerator position-based musical interval setter 2108 holds a predetermined adjusted musical interval value of the sound source data at each accelerator position. Upon receipt of the accelerator position information output from acquirer 11, accelerator position-based musical interval setter 2108 outputs the adjusted musical interval value corresponding to the accelerator position.

For example, in this embodiment, driving speed-based musical interval setter 2107 is a table in which the horizontal axis represents the driving speed and the vertical axis represents the adjusted musical interval value. On the other hand, accelerator position-based musical interval setter 2108 is a table in which the horizontal axis represents the accelerator position and the vertical axis represents the adjusted musical interval value. In accordance with the values indicated by the information, the adjusted musical interval values acquired by table lookup are output. This embodiment is however not limited thereto.

Set musical interval calculator 2104 calculates a musical interval adjusting value for adjusting the musical interval of the sound source data and outputs the calculated musical interval adjusting value. Used for the calculation are: the adjusted musical interval value at a driving speed output from driving speed-based musical interval setter 2107; and the adjusted musical interval value at an accelerator position output from accelerator position-based musical interval setter 2108.

Volume adjustment processor 2101 multiplies the volume of the sound source data output from reproducer 13 by the volume gain value calculated by set volume calculator 2103 to change the volume of the sound source data.

Musical interval adjustment processor 2102 adjusts the musical interval of the sound source data output from the reproducer with the musical interval adjusting value calculated by Set musical interval calculator 2104. The adjustment of the musical interval may be pitch shifting, a limit of the bandwidth using a band-pass filter with a controlled central frequency, or another method.

Reproducing signal 103 after the adjustment of the volume or the musical interval may be output as first adjustment processing data 105.

The diagram of FIG. 6 shows a configuration per sound source data. If there a plurality of sound source data, this configuration exists for each sound source data. In this case, the details of tables of driving speed-based volume setter 2105, accelerator position-based volume setter 2106, driving speed-based musical interval setter 2107, and accelerator position-based musical interval setter 2108 are set individually for each sound source data.

FIGS. 4 and 5A to 5C illustrate the states of signals before and after processing of the first adjuster according to this embodiment.

Reproducing signals 103_1, 103_2, and 103_3 output from reproducer 13 at the same time have frequency characteristics 110, 120, and 130, respectively, which are different from each other.

Each of first adjusters 15_1, 15_2, and 15_3 includes a driving speed-based volume setter, a driving speed-based musical interval setter, an accelerator position-based volume setter, and an accelerator position-based musical interval setter for the first adjustment processing of the corresponding one of reproducing signals 103_1, 103_2, and 103_3. In accordance with the driving speed information and the accelerator position information output from acquirer 11, each volume gain value and each musical interval adjusting value are calculated individually. Based on the values, the volume adjustment processor and the musical interval adjustment processor change the volume and the musical interval, respectively.

First adjusters 15_1, 15_2, and 15_3 output first adjustment processing data 105_1, 105_2, and 105_3, respectively. Graphs 111, 121, and 131 show the frequency characteristics of first adjustment processing data 105_1, 105_2, and 105_3, respectively, in a first driving condition at a certain driving speed and at a certain accelerator position. Similarly, graphs 112, 122, and 132 show the frequency characteristics of first adjustment processing data 105_1, 105_2, and 105_3, respectively, in a second driving condition at another driving speed and at another accelerator position. Graphs 113, 123, and 133 show the frequency characteristics of first adjustment processing data 105_1, 105_2, and 105_3, respectively, in a third driving condition. In this manner, in a certain driving condition, first adjustment processing data 105_1, 105_2, and 105_3 are adjusted to have frequency characteristics different from each other.

In this embodiment, first adjuster 15 adjusts a reproducing signal in accordance with the vehicle information indicating the driving speed and/or the accelerator position. For example, first adjuster 15 may adjust a reproducing signal generated by one of a plurality of sound sources in accordance with only the driving speed, and a reproducing signal generated by another sound source in accordance with only the accelerator position. Alternatively, first adjuster 15 may adjust only the volume or musical interval of a reproducing signal.

[Second Adjuster 16]

Assume that determiner 12 determines that the change amount of the vehicle information is smaller than or equal to a predetermined change amount. In this case, second adjuster 16 performs a second adjustment of the plurality of sound source data after the first adjustment. The second adjustment is the processing of changing at least one of the volume or musical interval of at least one of the plurality of sound source data after the first adjustment.

Figure 7:
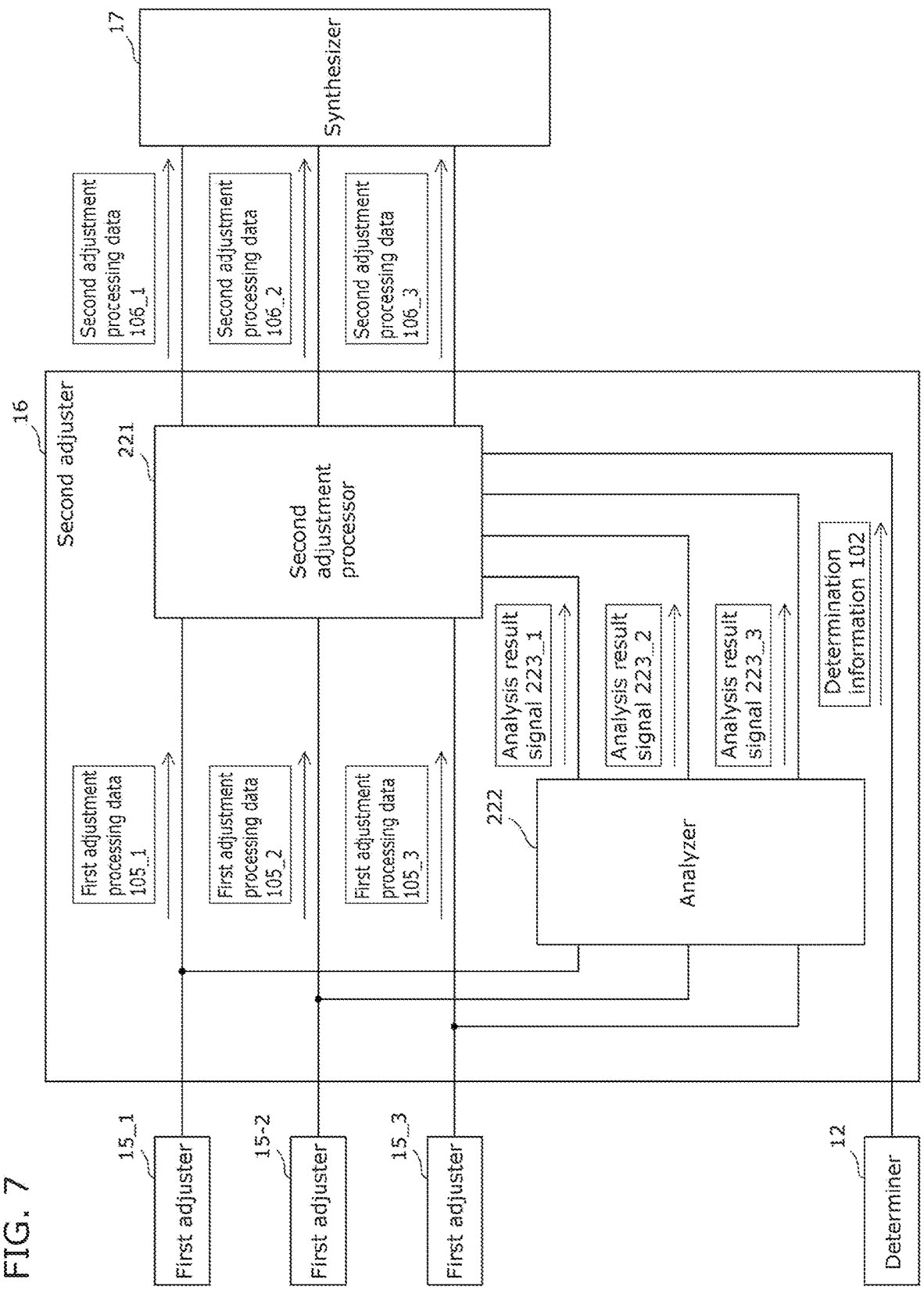
FIG. 7 is a diagram of a second adjuster according to the embodiment.

FIG. 7 shows a configuration of the second adjuster. The second adjuster receives first adjustment processing data 105_1, 105_2, and 105_3 that are outputs from first adjusters 15_1, 15_2, and 15_3, and determination information 102 that is an output from determiner 12.

Second adjustment processor 221 receives analysis result signals 223_1, 223_2, and 223_3, selects one(s) of first adjustment processing data 105_1, 105_2, and 105_3 to be subjected to the second adjustment processing, and performs the adjustment of the selected first adjustment processing data. Second adjustment processing data 106_1, 106_2, and 106_3, which are the signals after the processing, are output to synthesizer 17.

Analyzer 222 measures the physical quantities, such as the sound pressure energies or peak levels, of first adjustment processing data 105_1, 105_2, and 105_3, analyzes the measurement result to determine the order of the energies or levels. Analyzer 222 outputs the results in the form of analysis result signals 223_1, 223_2, and 223_3.

Assume that determiner 12 determines that the change amount of the vehicle information is larger than the predetermined change amount. In this case, second adjuster 16 performs no second adjustment and outputs, to synthesizer 17, the plurality of sound source data after the first adjustment without being changed. If there is a large change in the vehicle information, the driving sound data reflecting the change can be output without adjusting the volume. The occupant recognizes the driving condition from the output sound.

Second adjustment processor 221 may adjust at least one of the volume or musical interval of one(s) of first adjustment processing data (i.e., in a number smaller than the total number of the first adjustment processing data). That is, second adjustment processor 221 selects an adjustment target(s) adjusted in terms of at least one of the volume or musical interval from the plurality of first adjustment processing data. Second adjustment processor 221 adjusts at least one of the volume(s) or musical interval(s) of the one(s) of the first adjustment processing data as the adjustment target(s).

Specifically, second adjustment processor 221 may exclude the following one of the first adjustment processing data from the adjustment target(s). The one is analyzed to have the largest sound pressure energy or the highest peak of the sound pressure level of the frequency characteristics by analyzer 222. Second adjustment processor 221 may determine the following one of the first adjustment processing data as an adjustment target. The one is analyzed to have the second largest sound pressure energy or the second highest peak of the sound pressure level of the frequency characteristics by analyzer 222.

Figure 5A:
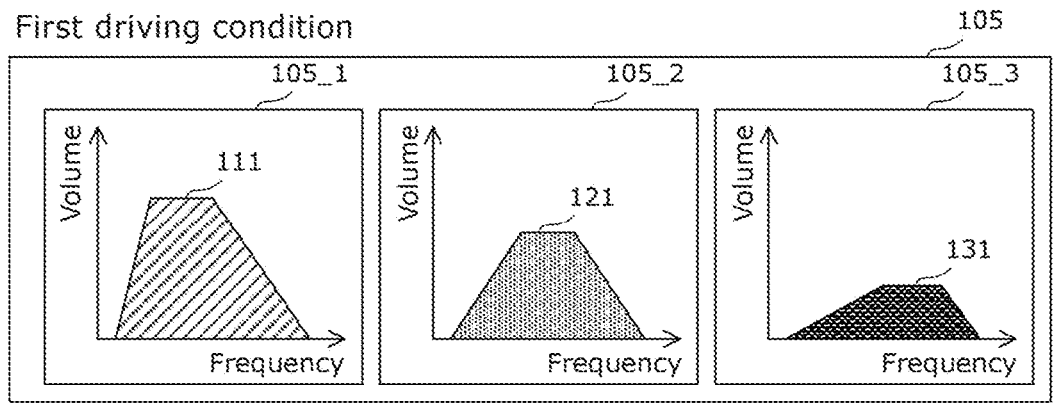
FIG. 5A illustrates the states of signals after the first adjustment by the first adjuster in a first driving condition.

For example, assume that analyzer 222 analyzes the peak levels of respective frequency characteristics 111, 121, and 131 of first adjustment processing data 105_1, 105_2, and 105_3 in the first driving condition shown in FIG. 5A. Analyzer 222 orders 105_1, 105_2, and 105_3 in a descending order of the peak levels. Analysis result signals 223_1, 223_2, and 223_3 indicating the analysis results are output with numbers 1, 2, and 3 in the descending order of the peak levels of frequency characteristics 111, 112, and 113. Upon receipt of analysis result signals 223_1, 223_2, and 223_3, second adjustment processor 221 determines first adjustment processing data 105_2 with the second highest peak level as an adjustment target signal.

Figure 5B:
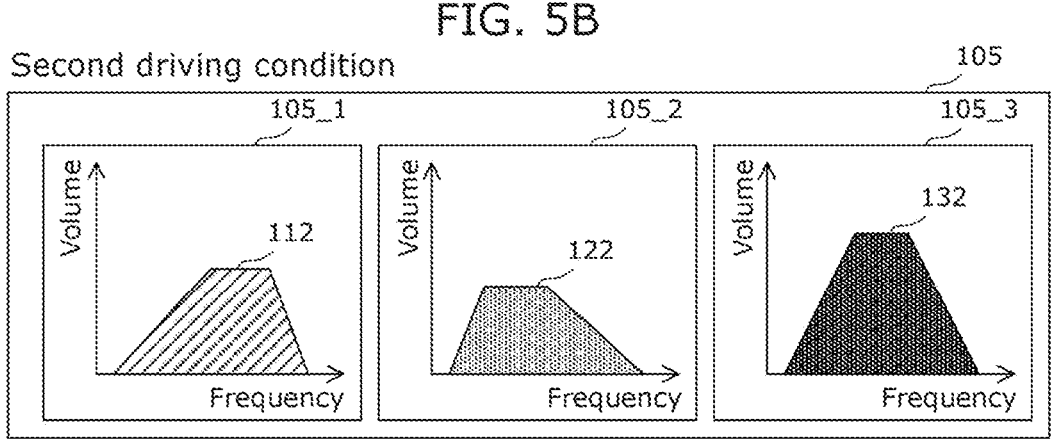
FIG. 5B illustrates the states of signals after the first adjustment by the first adjuster in a second driving condition.

Similarly, in the second driving condition shown in FIG. 5B, analyzer 222 orders 105_3, 105_1, and 105_2 in a descending order of the peak levels based on the analysis of frequency characteristics 112, 122, and 132. Analysis result signals 223_1, 223_2, and 223_3 indicating the analysis results are output with numbers 2, 3, and 1 in the descending order of the peak levels of frequency characteristics 112, 122, and 132. Upon receipt of the signals, second adjustment processor 221 determines first adjustment processing data 105_1 with the second highest peak level as an adjustment target signal.

Figure 5C:
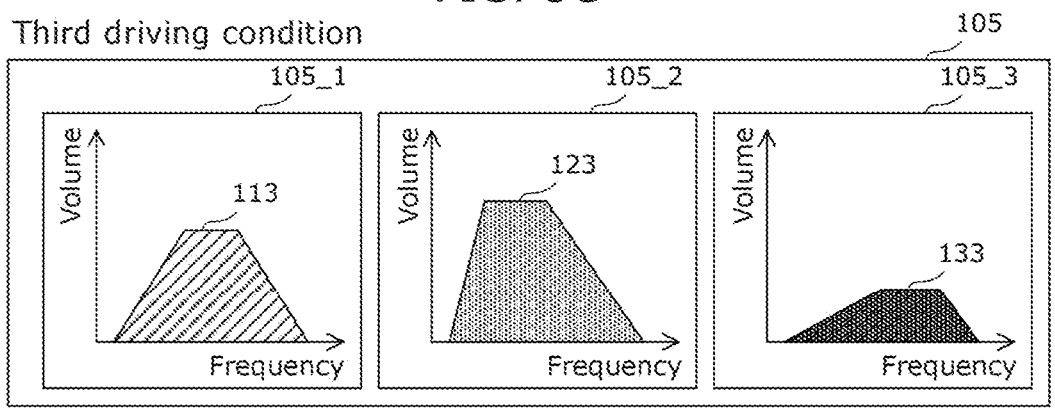
FIG. 5C illustrates the states of signals after the first adjustment by the first adjuster in a third driving condition.

Similarly, in the third driving condition shown in FIG. 5C, analyzer 222 orders 105_2, 105_1, and 105_3 in a descending order of the peak levels based on the analysis of frequency characteristics 113, 123, and 133. Analysis result signals 223_1, 223_2, and 223_3 indicating the analysis results are output with numbers 2, 1, and 3 in the descending order of the peak levels of frequency characteristics 113, 123, and 133. Upon receipt of the signals, second adjustment processor 221 determines first adjustment processing data 105_1 with the second highest peak level as an adjustment target signal.

Note that second adjustment processor 221 may determine the following ones of the first adjustment processing data as adjustment targets. The ones are determined to have the third and subsequent order of sound pressure energy or peak sound pressure level of the frequency characteristics by analyzer 222. In this manner, the target(s) of the second adjustment may be a part or all of the first adjustment processing data except for the excluded one.

Second adjuster 16 may determine one(s) of the first adjustment processing data as an adjustment target(s) applying the hearing characteristics of human. Specifically, second adjustment processor 221 may exclude the following one of the first adjustment processing data from the adjustment target(s). The one is analyzed, by analyzer 222, to be most easily perceived applying the hearing characteristics of human. Second adjustment processor 221 may determine the following one of the first adjustment processing data as an adjustment target. The one is analyzed, by analyzer 222, to be second most easily perceived applying the hearing characteristics of human. Second adjustment processor 221 may determine the following one of the first adjustment processing data as an adjustment target. The one is analyzed, by analyzer 222, to be third most or in a subsequent order easily perceived applying the hearing characteristics of human. Note that the hearing characteristics of human are represented by an equal-loudness contour, for example.

For example, analyzer 222 performs ⅓ octave band analysis of each first adjustment processing data to calculate the sound pressure level for each ⅓ octave band. Next, analyzer 222 adds a characteristic correcting value according to an equal-loudness contour to the sound pressure level for each ⅓ octave band to calculate a corrected octave band value. After that, analyzer 222 determines the order of the sound source data easily perceived by human using, as an index, the maximum or the sum of corrected octave band values corresponding to the first adjustment processing data.

Figure 8:
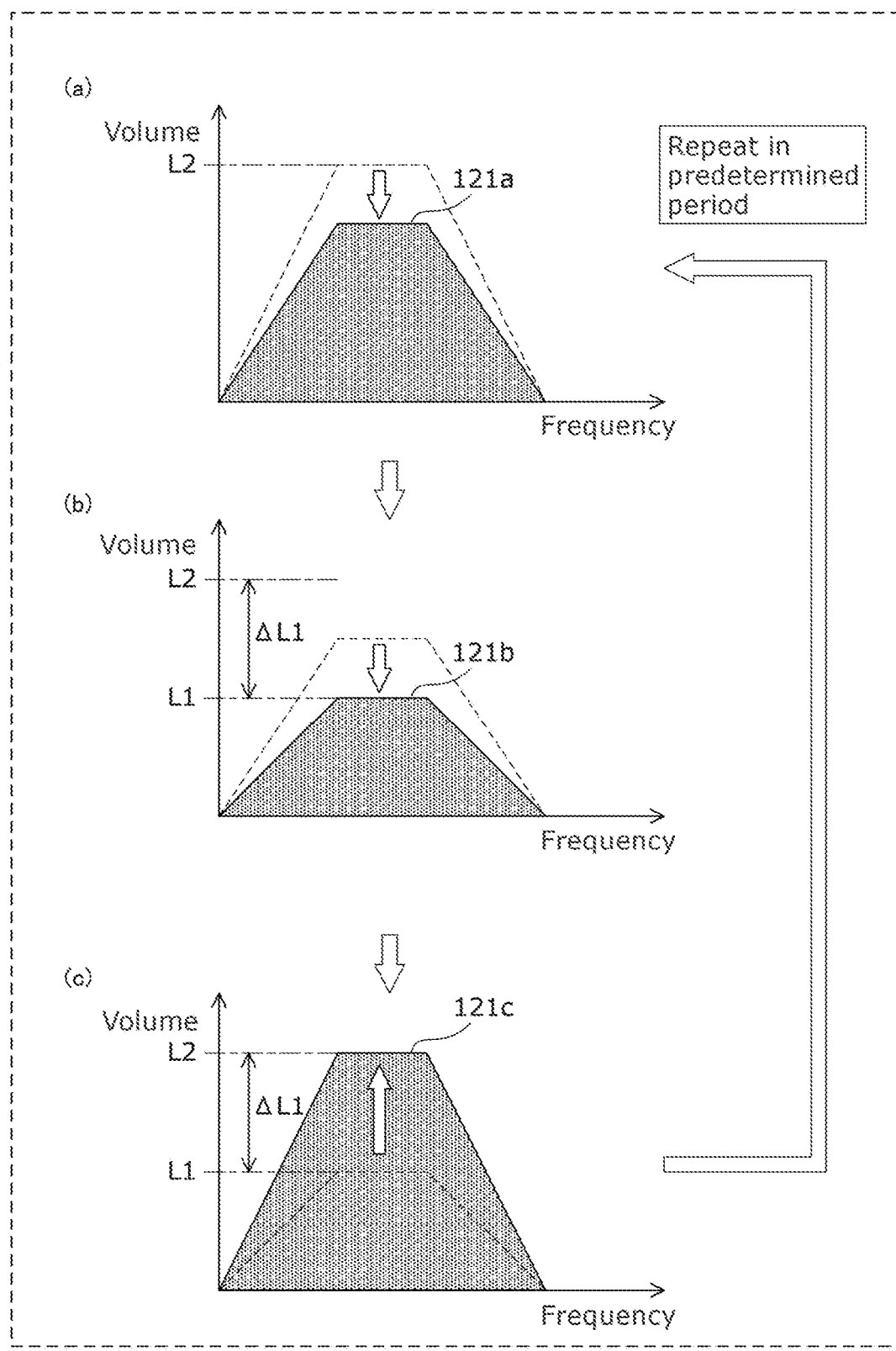
FIG. 8 illustrates first example processing on sound source data after the first adjustment which has been determined as an adjustment target.

Specific example processing of first adjustment processing data determined as an adjustment target will be described. FIG. 8 illustrates first example processing of first adjustment processing data determined as an adjustment target.

In FIG. 8, reference numeral 121 denotes the frequency characteristics of first adjustment processing data 105_2 determined as a target of the second adjustment processing in driving condition 1 in FIG. 5A. In time series, second adjustment processor 221 may increase or decrease the sound pressure level of, the adjustment target, first adjustment processing data 105_2 by predetermined sound pressure level difference ΔL1. In time series, second adjustment processor 221 may increase or decrease the sound pressure level in a predetermined period. That is, second adjustment processor 221 increases or decreases the sound pressure level of first adjustment processing data 105_2 every moment. The increase and decrease may be, for example, the following processing. Lower limit L1 is the sound pressure level acquired by subtracting the half of predetermined sound pressure level difference ΔL1 from the sound pressure level at the start of the second adjustment ((a) in FIG. 8). The sound pressure level of the sound source data as the adjustment target is gradually decreased to lower limit L1. After reaching lower limit L1 ((b) in FIG. 8), the sound pressure level of the sound source data as the adjustment target is gradually increased to upper limit L2. Upper limit L2 is the sound pressure level acquired by adding the half of predetermined sound pressure level difference ΔL1 to the sound pressure level at the start of the second adjustment. After reaching upper limit L2 ((c) in FIG. 8), the sound pressure level is decreased to lower limit L1. This procedure is repeated in a predetermined period. Accordingly, the frequency characteristics of second adjustment processing data 106_2 output from second adjustment processor 221 are changed to frequency characteristics 121a, 121b, and 121c.

Note that the lower limit of the sound pressure level is not limited to that described above, as long as being lower than the sound pressure level at the start of the second adjustment. Similarly, the upper limit of the sound pressure level is not limited to that described above, as long as being equal to or higher than the sound pressure level at the start of the adjustment and higher than the lower limit by a predetermined sound pressure level difference.

Second adjustment processor 221 may adjust the period of raising or lowering the sound pressure level. Second adjustment processor 221 may adjust the of raising or lowering the sound pressure level in accordance with the vehicle information. That is, second adjustment processor 221 may increase or decrease the sound pressure level in a predetermined period according to the vehicle information. For example, second adjustment processor 221 may increase or decreases the sound pressure level in a shorter period at a lower driving speed. Second adjustment processor 221 may increase or decreases the sound pressure level at a shorter period at a lower accelerator position as indicated by the vehicle information. Second adjuster 16 may adjust at least one of the period or the sound pressure level difference for raising or lowering the sound pressure level in accordance with the duration in which the change amount of the vehicle information is smaller than or equal to the predetermined change amount.

Assume that a change amount of the vehicle information smaller than or equal to the predetermined change amount continues longer than a predetermined time. Even in this case, second adjuster 16 may not adjust and fix the predetermined period. At this time, if the predetermined period is adjusted as described above, the period is fixed to the predetermined period in which a change amount of the vehicle information smaller than or equal to the predetermined change amount continues longer than the predetermined time. The period may be fixed to a predetermined period. Second adjuster 16 may periodically adjust the predetermined period of raising or lowering the sound pressure level by the predetermined sound pressure level difference.

Figure 9:
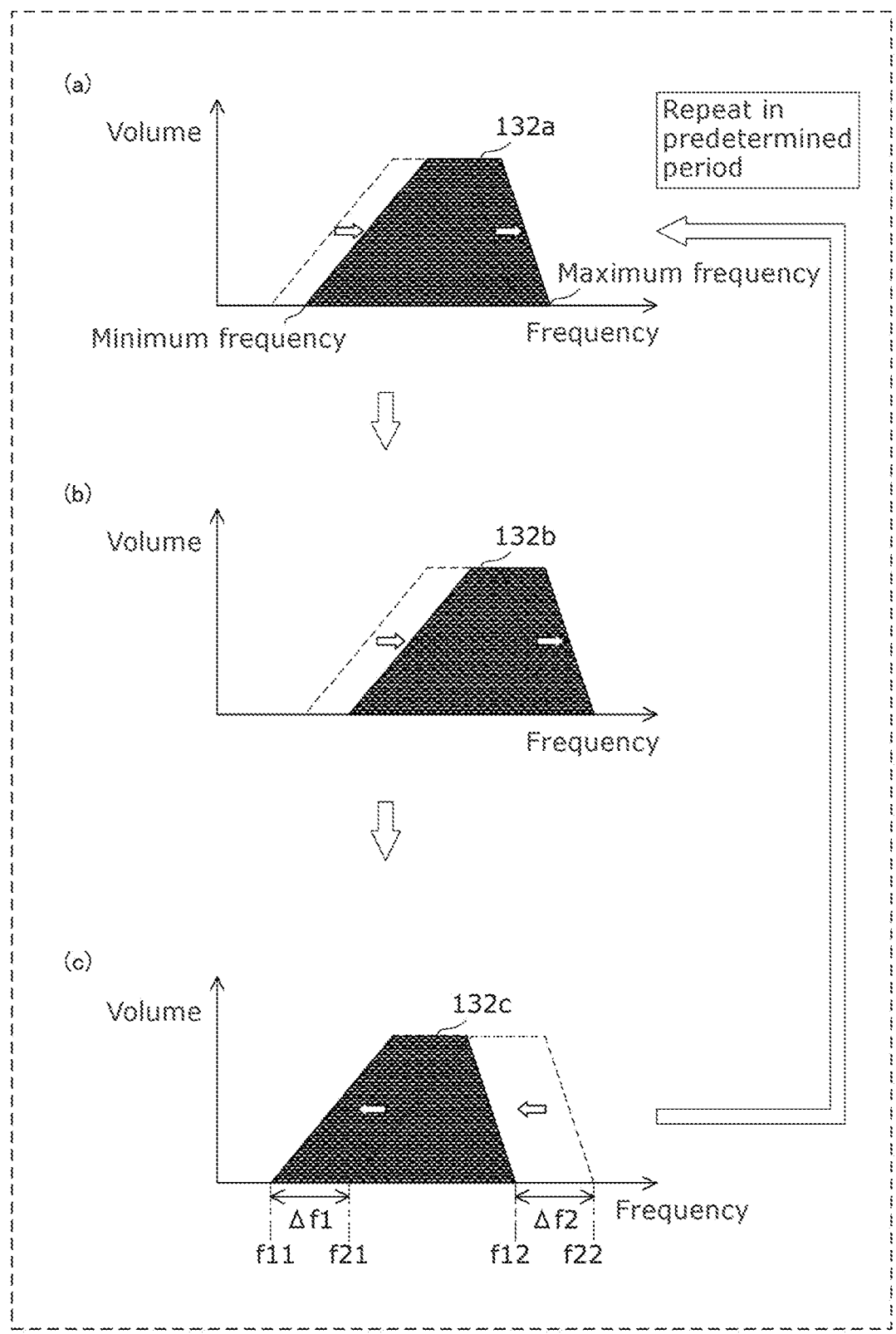
FIG. 9 illustrates second example processing on sound source data after the first adjustment which has been determined as an adjustment target.

FIG. 9 illustrates second example processing of first adjustment processing data determined as an adjustment target. In FIG. 9, graph 132 shows the frequency characteristics of first adjustment processing data 105_1 determined as a target of the second adjustment processing in driving condition 2 in FIG. 5B. In time series, second adjustment processor 221 may vary at least one of the minimum or maximum frequency of the adjustment target, first adjustment processing data 105_1 within the frequency range by a predetermined difference. This variation will be referred to as a "frequency variation". In time series, second adjuster 16 may vary the frequency by the predetermined frequency difference in a predetermined period. Specifically, second adjustment processor 221 varies at least one of the minimum or maximum frequency of the adjustment target, first adjustment processing data 105_1 every moment. The variation may be, for example, the following processing. Lower limit f11 is the frequency acquired by subtracting the half of predetermined frequency difference Δf1 from the minimum frequency at the start of the second adjustment ((a) in FIG. 9). The minimum frequency of the sound source data as the adjustment target is gradually decreased to lower limit f11. After reaching lower limit f11 ((b) in FIG. 9), the minimum frequency of the sound source data as the adjustment target is gradually increased to upper limit f21. Upper limit f21 is the frequency acquired by adding the half the predetermined difference to the minimum frequency at the start of the second adjustment. After reaching upper limit f21 ((c) in FIG. 9), the minimum frequency is decreased to lower limit f11. This procedure is repeated in a predetermined period. The variation may be, for example, the following processing. Lower limit f12 is the frequency acquired by subtracting the half of predetermined frequency difference Δf2 from the maximum frequency at the start of the second adjustment ((a) in FIG. 9). The maximum frequency of the sound source data as the adjustment target is gradually decreased to lower limit f12. After reaching lower limit f12 ((b) in FIG. 9), the maximum frequency of the sound source data as the adjustment target is gradually increased to upper limit f22. Upper limit f22 is the frequency acquired by adding the half the predetermined frequency difference to the maximum frequency at the start of the second adjustment. After reaching upper limit f22 ((c) in FIG. 9), the maximum frequency is decreased to lower limit f12. This procedure is repeated in a predetermined period. Accordingly, the frequency characteristics of second adjustment processing data 106_3 output from second adjustment processor 221 are changed to frequency characteristics 131a, 131b, and 131c.

Note that the lower limits of the minimum and maximum frequencies are not limited to those described above, as long as being lower than the minimum and maximum frequencies at the start of the second adjustment, respectively. Similarly, the upper limits of the minimum and maximum frequencies are not limited to those described above, as long as being equal to or higher than the minimum and maximum frequencies at the start of the adjustment and higher than the lower limits of the minimum and maximum frequencies by predetermined frequency differences, respectively.

Second adjustment processor 221 may adjust the predetermined period for varying at least one of the minimum or maximum frequency. Second adjustment processor 221 may adjust at least one of the predetermined period or the predetermined frequency difference for varying the frequency in accordance with the vehicle information. That is, second adjustment processor 221 may vary at least one of the minimum or maximum frequency in the predetermined period according to the vehicle information. For example, second adjustment processor 221 may vary the frequency in a shorter period at a lower driving speed as indicated by the vehicle information. Second adjustment processor 221 may vary the frequency in a shorter period at a smaller acceleration as indicated by the vehicle information. Second adjustment processor 221 may adjust at least one of the predetermined period or the predetermined frequency difference for varying the frequency in accordance with the duration in which the change amount of the vehicle information is smaller than or equal to the predetermined change amount. Assume that a change amount of the vehicle information smaller than or equal to the predetermined change amount continues longer than a predetermined time. In this case, second adjustment processor 221 may not adjust and fix the predetermined period. At this time, the period may be fixed to the predetermined period in which a change amount of the vehicle information smaller than or equal to the predetermined change amount continues longer than the predetermined time. The period may be fixed to a predetermined period. Second adjustment processor 221 may periodically change the predetermined period of raising or lowering the sound pressure level.

Second adjuster 16 may adjust the predetermined frequency difference, that is, the amplitude for varying the frequency in accordance with the vehicle information. That is, second adjuster 16 may vary the frequency in accordance with the vehicle information. For example, second adjustment processor 221 may vary the frequency with a smaller amplitude at a lower driving speed as indicated by the vehicle information. Second adjustment processor 221 may vary the frequency with a smaller amplitude at a smaller acceleration as indicated by the vehicle information.

Figure 10:
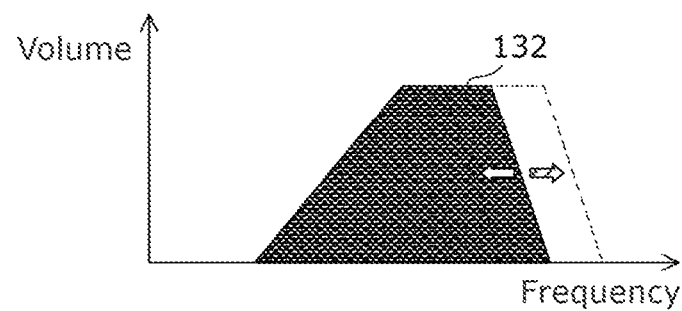
FIG. 10 illustrates another example processing on sound source data after the first adjustment which has been determined as an adjustment target.
Figure 11:
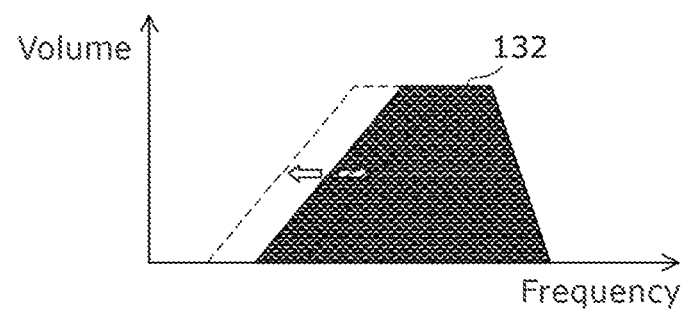
FIG. 11 illustrates yet another example processing on sound source data after the first adjustment which has been determined as an adjustment target.
Figure 12:
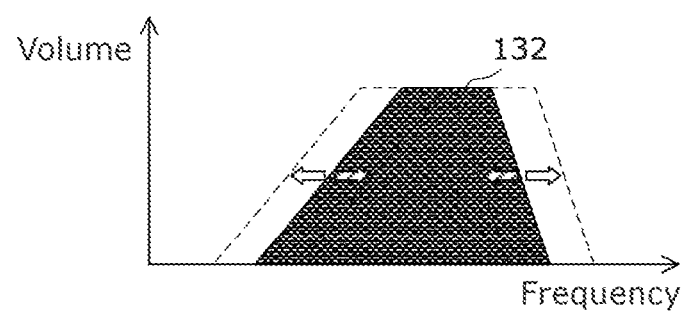
FIG. 12 illustrates another example processing on sound source data which has been determined as an adjustment target.

In the example of FIG. 9, both the minimum and maximum frequencies vary (i.e., increase or decrease) in the same direction in the second adjustment. The variations are not limited thereto. For example, second adjustment processor 221 may vary (i.e., increase or decrease) only the maximum frequency of frequency characteristics 132 of first adjustment processing data 105_1 as shown in FIG. 10. For example, second adjustment processor 221 may vary (i.e., increase or decrease) only the minimum frequency of frequency characteristics 132 of first adjustment processing data 105_1 as shown in FIG. 11. For example, second adjustment processor 221 may vary (i.e., increase or decrease) the minimum and maximum frequencies of frequency characteristics 132 of first adjustment processing data 105_1 in directions different from each other as shown in FIG. 12. Specifically, in the case of FIG. 12, second adjustment processor 221 may decrease the maximum frequency when increasing the minimum frequency, and increase the maximum frequency when decreasing the minimum frequency.

With this configuration, second adjustment processor 221 effectively adjust at least one of the volume or musical interval of sound source data determined as an adjustment target.

[Synthesizer 17]

Synthesizer 17 mixes second adjustment processing data 106, which are outputs of second adjuster 16, to generate driving sound data 107 to be output to space 55 in the cabin of vehicle 50. This driving sound data 107 is a pseudo driving sound. If there are a plurality of outputters 18, synthesizer 17 selects signals to be output to respective outputters, mixes the selected signals, and outputs the mixed signals.

[Outputter 18]

Outputter 18 converts pseudo driving sound data 107 generated by synthesizer 17 into driving sound signal 108 and amplifies and outputs driving sound signal 108 to space 55 in the cabin of vehicle 50. Outputter 18 outputs the pseudo driving sound to speaker 53.

Each of processors included in driving sound generation device 10 may be, for example, a processor such as a digital signal processor (DSP), but may be a microcomputer or a dedicated circuit, or may be a combination of two or more of a processor, a microcomputer, and a dedicated circuit. Storage 14 may be a non-volatile memory or storage.

[Operation of Driving Sound Generation Device]

Figure 13:
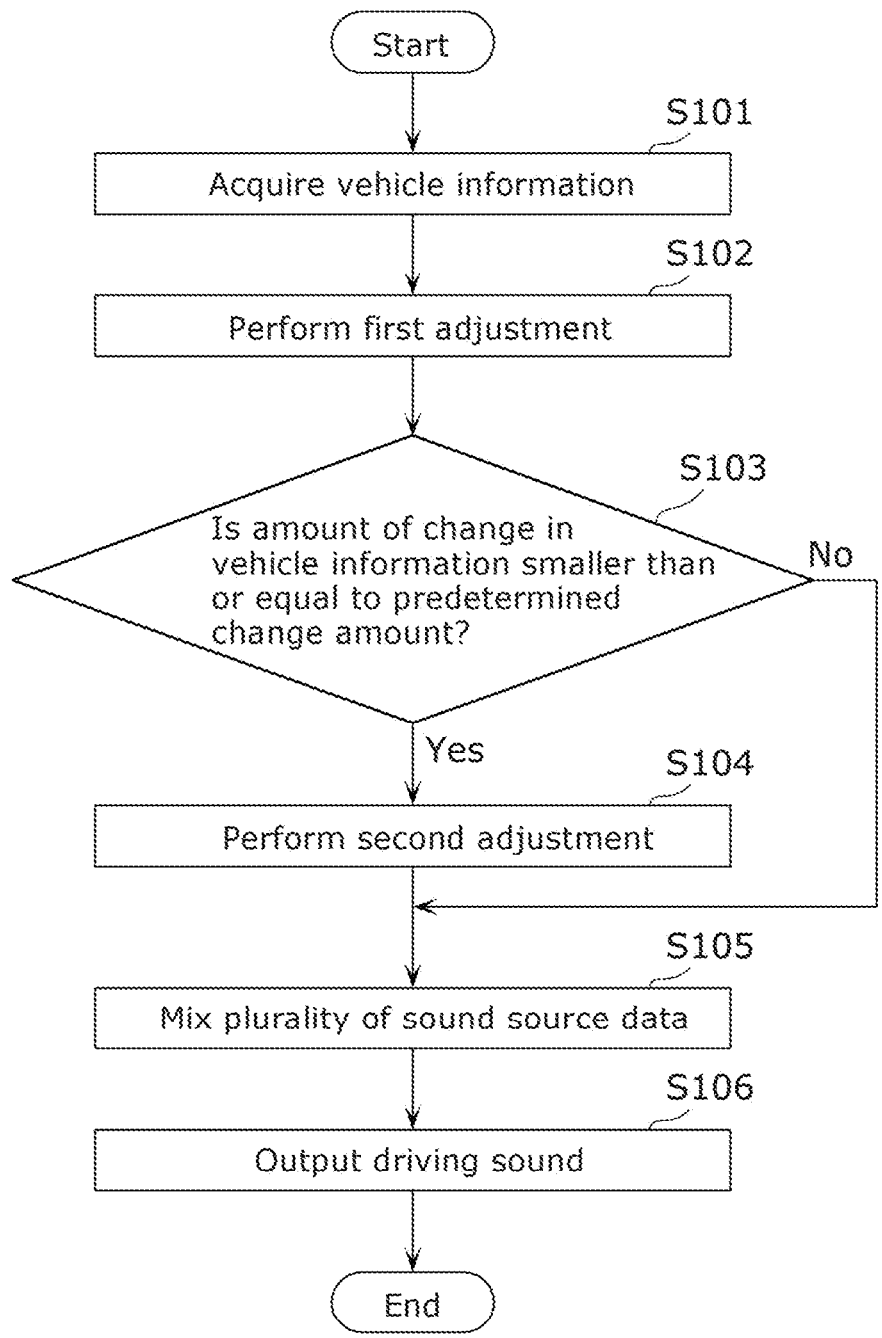
FIG. 13 is a flowchart showing an example operation (i.e., driving sound generation method) of the driving sound generation device.

FIG. 13 is a flowchart showing an example operation (i.e., driving sound generation method) of the driving sound generation device.

First, driving sound generation device 10 acquires vehicle information 109 on the drive inside vehicle 50 from vehicle controller 52 (S101). The processing in step S101 is executed by acquirer 11.

Then, driving sound generation device 10 performs a first adjustment of at least one of the volume or musical interval of reproducing signal 103 from reproducer 13 in accordance with the vehicle information (S102). The processing in step S102 is executed by first adjuster 15.

Next, driving sound generation device 10 determines whether the change amount of the vehicle information is smaller than or equal to a predetermined change amount (S103). The processing in step S103 is executed by determiner 12.

Assume that determiner 12 determines that the change amount of the vehicle information is smaller than or equal to the predetermined change amount (Yes in S103). In this case, driving sound generation device 10 performs a second adjustment of the plurality of sound source data after the first adjustment (S104). The processing in step S104 is executed by second adjuster 16.

On the other hand, assume that determiner 12 determines that the change amount of the vehicle information is larger than the predetermined change amount (No in S103). In this case, driving sound generation device 10 performs no second adjustment and outputs, to synthesizer 17, the plurality of sound source data after the first adjustment without being changed.

Driving sound generation device 10 then mixes second adjustment processing data 106, which are outputs of second adjuster 16, to generate driving sound data 107 to be output to space 55 in the cabin of vehicle 50 (S105). The processing in step S105 is executed by synthesizer 17.

Driving sound generation device 10 converts pseudo driving sound data 107 generated by synthesizer 17 into driving sound signal 108, and amplifies and outputs driving sound signal 108 to space 55 in the cabin of vehicle 50 (S106). The processing in step S106 is executed by outputter 18.

Note that steps S101 to S107 are performed sequentially in the drive of vehicle 50.

As described above, at least one of the volume or musical interval of first adjustment processing data 105 is adjusted in accordance with the vehicle information. For example, the sound source data, which is a target of the second adjustment, differs among the first, second, and third driving conditions. A specific example of the second adjustment and mixture in each of the first to third driving conditions will be described.

Figure 14:
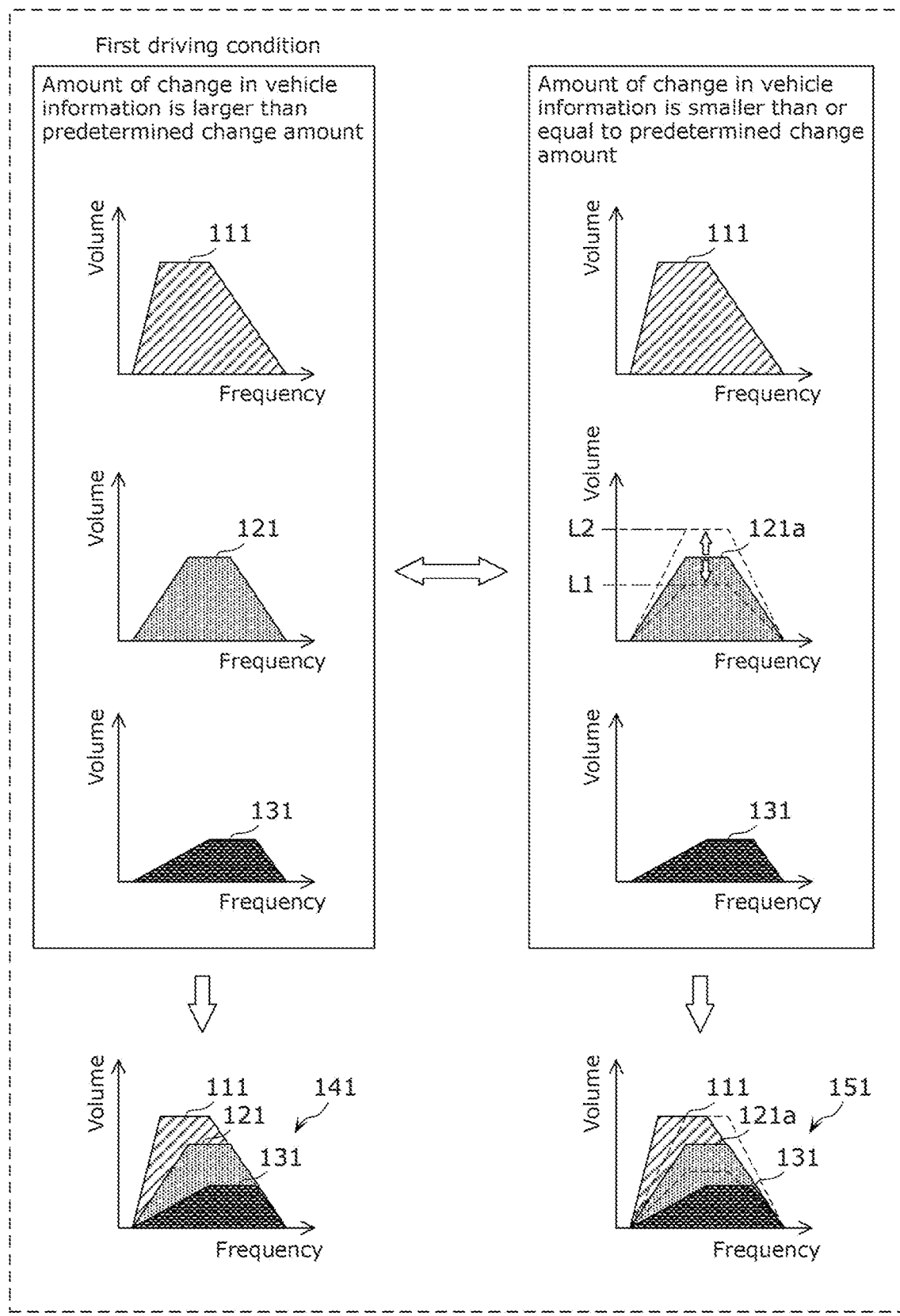
FIG. 14 illustrates a second adjustment and mixture in the first driving condition.

FIG. 14 illustrates a second adjustment and mixture in the first driving condition.

In the first driving condition, among frequency characteristics 111, 121, and 131 of first adjustment processing data 105_1, 105_2, and 105_3, frequency characteristics 111 of first adjustment processing data 105_1 have the highest peak of the sound pressure level. Accordingly, first adjustment processing data 105_1 with frequency characteristics 111 is excluded from the target(s) of the second adjustment. Among first adjustment processing data 105_1, 105_2, and 105_3, frequency characteristics 121 of first adjustment processing data 105_2 have the second highest peak of the sound pressure level. Accordingly, first adjustment processing data 105_2 with frequency characteristics 121 is determined as the adjustment target. Assume that determiner 12 determines that the change amount of the vehicle information is smaller than or equal to the predetermined change amount. In this case, second adjustment processing data 106_1 and 106_3, which are first adjustment processing data 105_1 and 105_3, and second adjustment processing data 106_2, which has frequency characteristics 121a acquired by performing the second adjustment of frequency characteristics 121, are mixed into driving sound 151. On the other hand, assume that determiner 12 determines that the change amount of the vehicle information is larger than the predetermined change amount. In this case, second adjustment processing data 106_1, 106_2, and 106_3, which are first adjustment processing data 105_1, 105_2, and 105_3 with frequency characteristics 111, 121, and 131 not subjected to the second adjustment, are mixed into driving sound 141. An example has been described with respect to FIG. 14 where frequency characteristics 121a are generated by increasing or decreasing the sound pressure level. Alternatively, an example is applicable where the characteristics are generated by varying at least one of the minimum or maximum frequency.

In FIG. 14, the target of the second adjustment is determined by comparing the peaks of the sound pressure levels of frequency characteristics 111, 121, and 131 of first adjustment processing data 105_1, 105_2, and 105_3. The determination is however not limited thereto. The target of the second adjustment may be determined by comparing the sound pressure energies of first adjustment processing data 105_1, 105_2, and 105_3. That is, the first adjustment processing data with the largest sound pressure energy may be excluded from the target(s) of the second adjustment. Alternatively, the first adjustment processing data with the second largest sound pressure energy may be determined as a target of the second adjustment.

Figure 15:
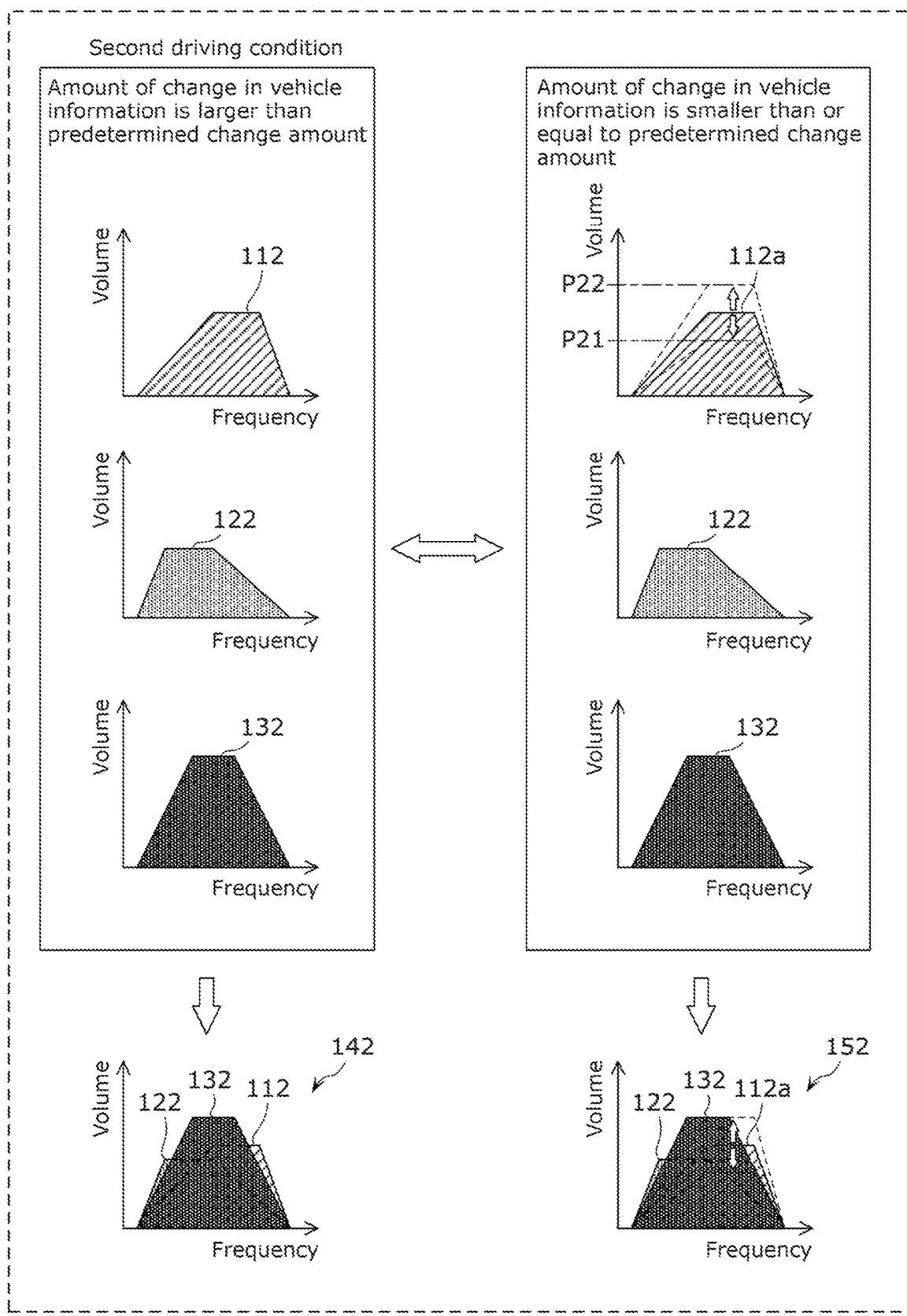
FIG. 15 illustrates a second adjustment and mixture in the second driving condition.

FIG. 15 illustrates a second adjustment and mixture in the second driving condition.

In the second driving condition, among frequency characteristics 112, 122, and 132 of first adjustment processing data 105_1, 105_2, and 105_3, frequency characteristics 132 of first adjustment processing data 105_3 have the highest peak of the sound pressure level. Accordingly, first adjustment processing data 105_3 with frequency characteristics 132 is excluded from the target(s) of the second adjustment. Among first adjustment processing data 105_1, 105_2, and 105_3, frequency characteristics 112 of first adjustment processing data 105_1 have the second highest peak of the sound pressure level. Accordingly, first adjustment processing data 105_1 with frequency characteristics 112 is determined as an adjustment target. Assume that determiner 12 determines that the change amount of the vehicle information is smaller than or equal to the predetermined change amount. In this case, second adjustment processing data 106_2 and 106_3, which are first adjustment processing data 105_2 and 105_3, and second adjustment processing data 106_1, which has frequency characteristics 112a acquired by performing the second adjustment of frequency characteristics 112, are mixed into driving sound 152. On the other hand, assume that determiner 12 determines that the change amount of the vehicle information is larger than the predetermined change amount. In this case, second adjustment processing data 106_1, 106_2, and 106_3, which are first adjustment processing data 105_1, 105_2, and 105_3 with frequency characteristics 112, 122, and 132 not subjected to the second adjustment, are mixed into driving sound 142. An example has been described with respect to FIG. 15 where frequency characteristics 112a are generated by increasing or decreasing the sound pressure level. Alternatively, an example is applicable where the characteristics are generated by varying at least one of the minimum or maximum frequency.

In FIG. 15, the target of the second adjustment is determined by comparing the peaks of the sound pressure levels of frequency characteristics 112, 122, and 132 of first adjustment processing data 105_1, 105_2, and 105_3. The determination is however not limited thereto. The target of the second adjustment may be determined by comparing the sound pressure energies of first adjustment processing data 105_1, 105_2, and 105_3. That is, the first adjustment processing data with the largest sound pressure energy may be excluded from the target(s) of the second adjustment. Alternatively, the first adjustment processing data with the second largest sound pressure energy may be determined as a target of the second adjustment.

Figure 16:
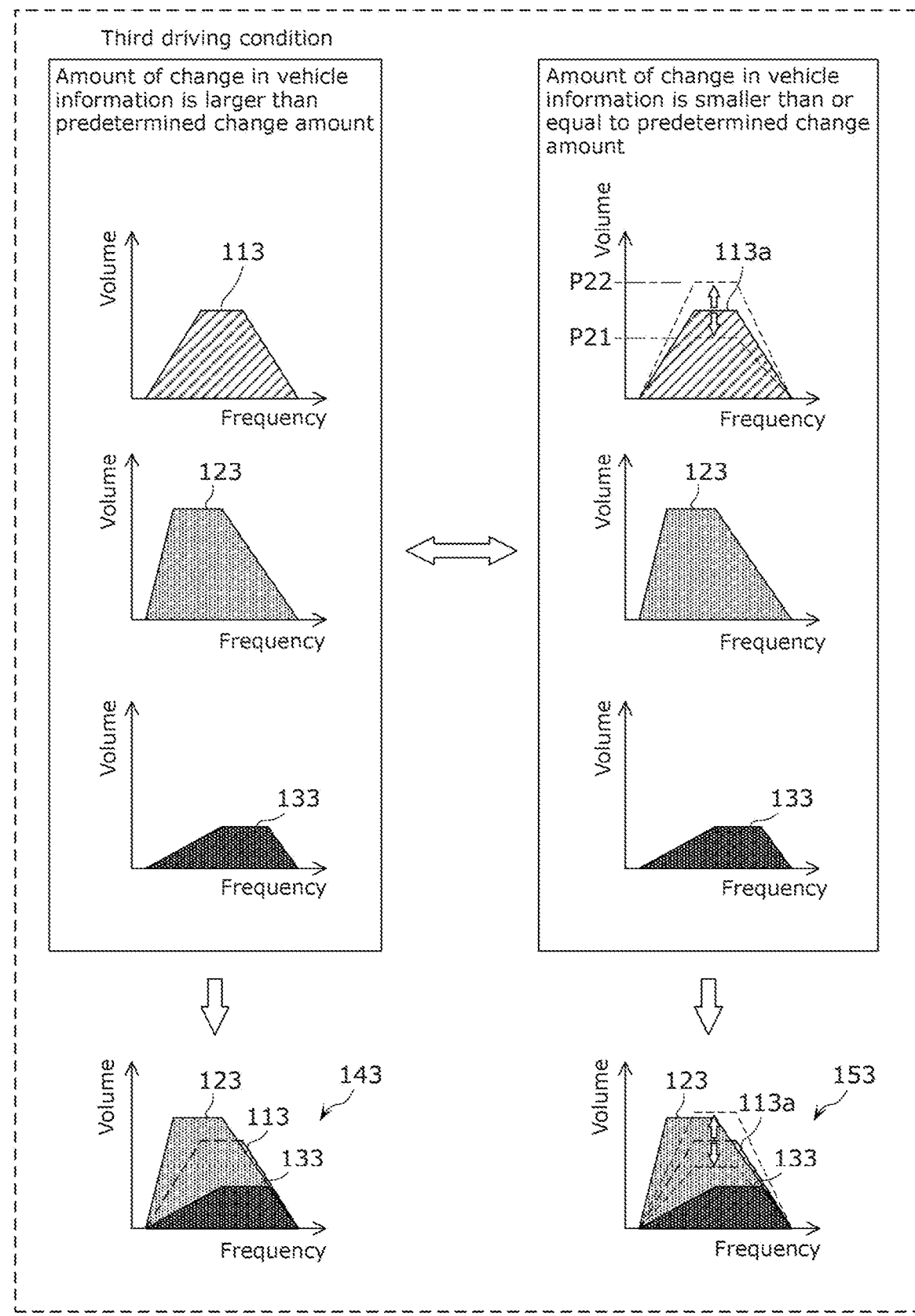
FIG. 16 illustrates a second adjustment and mixture in the third driving condition.

FIG. 16 illustrates a second adjustment and mixture in the third driving condition.

In the third driving condition, among frequency characteristics 113, 123, and 133 of first adjustment processing data 105_1, 105_2, and 105_3, frequency characteristics 123 of first adjustment processing data 105_2 has the highest peak of the sound pressure level. Accordingly, first adjustment processing data 105_2 with frequency characteristics 123 is excluded from the target(s) of the second adjustment. Among first adjustment processing data 105_1, 105_2, and 105_3, frequency characteristics 113 of first adjustment processing data 105_1 have the second highest peak of the sound pressure level. Accordingly, first adjustment processing data 105_1 with frequency characteristics 113 is determined as an adjustment target. Assume that determiner 12 determines that the change amount of the vehicle information is smaller than or equal to the predetermined change amount. In this case, second adjustment processing data 106_2 and 106_3, which are first adjustment processing data 105_2 and 105_3, and second adjustment processing data 106_1, which has frequency characteristics 113a acquired by performing the second adjustment of frequency characteristics 113, are mixed into driving sound 153. On the other hand, assume that determiner 12 determines that the change amount of the vehicle information is larger than the predetermined change amount. In this case, second adjustment processing data 106_1, 106_2, and 106_3, which are first adjustment processing data 105_1, 105_2, and 105_3 with frequency characteristics 113, 123, and 133 not subjected to the second adjustment, are combined into driving sound 143. An example has been described with respect to FIG. 16 where frequency characteristics 113a are generated by increasing or decreasing the sound pressure level. Alternatively, an example is applicable where the characteristics are generated by varying (i.e., increasing or decreasing) at least one of the minimum or maximum frequency.

In FIG. 16, the target of the second adjustment is determined by comparing the peaks of the sound pressure levels of frequency characteristics 113, 123, and 133 of first adjustment processing data 105_1, 105_2, and 105_3. The determination is however not limited thereto. The target of the second adjustment may be determined by comparing the sound pressure energies of first adjustment processing data 105_1, 105_2, and 105_3. That is, the first adjustment processing data with the largest sound pressure energy may be excluded from the target(s) of the second adjustment. Alternatively, the first adjustment processing data with the second largest sound pressure energy may be determined as a target of the second adjustment.

Advantageous Effects

Driving sound generation device 10 according to this embodiment adjusts the sound source data in accordance with a change in the vehicle information, and outputs, into the vehicle cabin, the changed sound source data as a pseudo driving sound for causing the occupant to recognize the driving condition. At this time, assume that the change amount of the vehicle information is smaller than or equal to the predetermined change amount. In this case, in order to vary the pseudo driving sound every moment, driving sound generation device 10 adjusts at least one of the plurality of sound source data generated as the driving sound. Accordingly, this configuration allows the occupant to recognize the driving condition of the vehicle using the pseudo driving sound, and effectively reduces the annoyance of the pseudo driving sound with substantially the same tone or volume due to a small change amount of the vehicle information.

In driving sound generation device 10 according to this embodiment, assume that the change amount of the vehicle information is determined to be larger than the predetermined change amount. Second adjuster 16 outputs, to synthesizer 17, the sound source data after the first adjustment without being changed. This configuration outputs the sound source data adjusted by the first adjuster without being changed, if the change amount of the vehicle information is larger than the predetermined change amount. Accordingly, the occupant feels driving from the pseudo driving sound because the adjustment of the vehicle information can be reflected on the sound source data.

In driving sound generation device 10 according to this embodiment, second adjuster 16 does not adjust, in the second adjustment, the one of the plurality of sound source data after the first adjustment with the largest sound pressure energy or the highest peak sound pressure level of the frequency characteristics. This configuration does not adjust the characteristics of the sound source data with the maximum volume out of the generated pseudo driving sound, if the change amount of the vehicle information is smaller than or equal to the predetermined change amount. While reflecting the driving condition information reflected on the sound source data continuously, the other sound source data is adjusted to reduce the annoyance in steady driving.

In driving sound generation device 10 according to this embodiment, second adjuster 16 adjusts, in the second adjustment, the frequency characteristics of the one of the plurality of sound source data after the first adjustment with the second largest sound pressure energy or the second highest peak of the sound pressure level of the frequency characteristics. This configuration allows the occupant to effectively perceive the change in the sound in the second adjustment, if the change amount of the vehicle information is smaller than or equal to the predetermined change amount. This configuration effectively reduces the annoyance of the pseudo driving sound in steady driving.

In driving sound generation device 10 according to this embodiment, second adjuster 16 identifies sound source data most easily perceived by human, out of the plurality of sound source data after the first adjustment, by hearing characteristics of human and does not adjust that sound source data in the second adjustment. This configuration does not adjust the characteristics of the sound source data most easily perceived by human and thus allows the occupant to effectively perceive the driving conditions reflected on the sound source data.

In driving sound generation device 10 according to this embodiment, second adjuster 16 identifies sound source data second most easily perceived by human, out of the plurality of sound source data after the first adjustment, by hearing characteristics of human and does adjust that sound source data in the second adjustment. This configuration adjusts the sound source data second most easily perceived by human. Assume that the change amount of the vehicle information is smaller than or equal to the predetermined change amount. In this case, this configuration allows the occupant to effectively perceives the change in the sound in the second adjustment, and effectively reduces the annoyance of the pseudo driving sound.

[Variation]

(1)

In the embodiment described above, driving sound generation device 10 generates the pseudo driving sound based on the plurality of sound source data. The generation is however not limited thereto. Driving sound generation device 10 may generate a sound to be output from speaker 53 in a vehicle cabin based on the following sound source data. The sound source data includes, in addition to the plurality of sound source data for generating the pseudo driving sound of vehicle 50, masker sound source data for generating a masker sound for masking a noise in the vehicle. Storage 14 stores the plurality of sound source data including the masker sound source data.

It is known that motor 57 tends to generate an electromagnetic noise within a frequency range from hundreds of hertz to several kilohertz due to the electromagnetic coercive power, which may annoy the driver. The electromagnetic noise of the motor is an example noise generated in the vehicle cabin. Driving sound generation device 10 according to a variation combines a masker sound for masking the electromagnetic noise of the motor in vehicle 50 and generates a pseudo driving sound. Driving sound generation device 10 then outputs the generated sound through speaker 53.

In driving sound generation device 10 according to the variation, first adjuster 15 may adjust masker sound source data for the masker sound, using the vehicle information. First adjuster 15 identifies the frequency characteristics of a noise generated in motor 57 based on the vehicle information. First adjuster 15 adjusts the sound pressure level and musical interval (pitch) of the sound source data for the masker sound to mask the identified frequency characteristics of the noise to generate a masker sound. Accordingly, a masker sound suitable for masking the generated noise is generated and the noise in the vehicle cabin is masked more effectively.

Second adjuster 16 excludes the masker sound from the target(s) of the second adjustment. That is, second adjuster 16 performs no second adjustment of the masker sound source data among the plurality of sound source data after the first adjustment. Synthesizer 17 mixes the plurality of sound source data after the second adjustment and the masker sound according to the masker sound source data after the first adjustment to generate a pseudo driving sound. Outputter 18 outputs the generated pseudo driving sound to the cabin of vehicle 50.

With this configuration, driving sound generation device 10 allows the driver to recognize the driving condition of the vehicle using the pseudo driving sound, and effectively reduces the pseudo driving sound annoying the driver. In addition, driving sound generation device 10 reduces the discomfort of a noise, such as an electromagnetic noise of motor 57, in the vehicle cabin.

In the embodiment described above, vehicle 50 includes motor 57 but may not include motor 57. Vehicle 50 may be, for example, an engine vehicle that acquires the power for driving from only an engine.

The electromagnetic noise of motor 57 is given as an example noise. The noise is however not limited to the electromagnetic noise of the motor but may be another kind of noise. The other kind of noise may be generated by a rotator equipped by vehicle 50 to drive the wheels. That is, the rotator may be a noise source in space 55 in vehicle 50. The rotator is placed, for example, in a space different from space 55. Specifically, the rotator may be placed in a space in an engine hood of vehicle body 54. The rotator is used for, for example, an engine, a drive shaft, and a turbocharger (or a turbine) to drive the wheels. Additionally or alternatively, the rotator may be used for a motor of an air conditioner of vehicle 50 for purposes other than the drive of the wheels. The frequency of the noise generated by such the rotator correlates with the number of rotations of the rotator. The number of rotations of the rotator is included in the vehicle information. Note that the rotator may include motor 57.

In the embodiment described above, each component may be dedicated hardware or may be achieved by executing software programs suitable for the constituent elements. The constituent elements may be implemented by a program executor such as a CPU or a processor reading and executing software programs recorded in a recoding medium such as a hard disk or a semiconductor memory.

The constituent elements may be circuits (or an integrated circuit). These circuits may be integrated into a single circuit as a whole or individual circuits. These circuits may be general-purpose circuits or dedicated circuits.

These general and specific aspects of the present disclosure may be implemented using a system, a device, a method, an integrated circuit, a computer program, or a non-transitory computer-readable recording medium such as a CD-ROM, or any combination of systems, devices, methods, integrated circuits, computer programs, or non-transitory computer-readable recording media.

For example, the present disclosure may be achieved as a driving sound generation method to be executed by a driving sound generation device (e.g., a computer or a DSP), or as a program related to the driving sound generation method to be executed by a computer or a DSP.

In the embodiment described above, the processing executed by a specific processor may be executed by another processor. The order of the plurality of processing in the operation of the driving sound generation device, which have been described above in the embodiment may be changed. Alternatively, some or all of the plurality of processing may be executed in parallel.

The present disclosure includes forms acquired by various modifications to the foregoing embodiment that can be conceived by those skilled in the art or forms achieved by freely mixing the constituent elements and functions in the foregoing embodiment without departing from the scope and spirit of the present invention.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings and claims are incorporated herein by reference in its entirety: Japanese Patent Application No. 2021-055504 filed on Mar. 29, 2021.

INDUSTRIAL APPLICABILITY

The driving sound generation device according to the present disclosure is useful as a device for generating a pseudo driving sound, for example.

The invention claimed is:

1. A driving sound generation device comprising:
an acquirer that acquires vehicle information on drive of a vehicle;
a storage that stores a plurality of sound source data including masker sound source data for generating a masker sound for masking a noise in the vehicle;
a first adjuster that performs a first adjustment of the plurality of sound source data in accordance with the vehicle information;
a determiner that determines whether a change amount of the vehicle information is smaller than or equal to a predetermined change amount;
a second adjuster that performs a second adjustment of at least one of the plurality of sound source data after the first adjustment other than the masker sound source data after the first adjustment, when the determiner determines that the change amount is smaller than or equal to the predetermined change amount;
a synthesizer that mixes the plurality of sound source data after the second adjustment and the masker sound according to the masker sound source data after the first adjustment to generate a pseudo driving sound to be output into a cabin of the vehicle; and
an outputter that outputs, to the cabin of the vehicle, the pseudo driving sound generated.

2. The driving sound generation device according to claim 1, wherein
the second adjuster does not perform the second adjustment of the masker sound source data after the first adjustment.

3. The driving sound generation device according to claim 1, wherein
the plurality of sound source data further include driving sound source data for generating the pseudo driving sound of the vehicle,
the first adjuster performs the first adjustment of the driving sound source data, and
the second adjuster performs the second adjustment of the driving sound source data after the first adjustment.

4. A driving sound generation method comprising:
acquiring vehicle information on drive of a vehicle;
performing a first adjustment of a plurality of sound source data stored in a storage in accordance with the vehicle information and including masker sound source data for generating a masker sound for masking a noise in the vehicle;
determining whether a change amount of the vehicle information is smaller than or equal to a predetermined change amount;
performing a second adjustment of at least one of the plurality of sound source data after the first adjustment other than the masker sound source data after the first adjustment, when the change amount is determined to be smaller than or equal to the predetermined change amount in the determining;
mixing the plurality of sound source data after the second adjustment and the masker sound according to the masker sound source data after the first adjustment to generate a pseudo driving sound to be output into a cabin of the vehicle; and
outputting, to the cabin of the vehicle, the pseudo driving sound generated.

* * * * *